United States Patent
Lee

(10) Patent No.: US 11,061,593 B2
(45) Date of Patent: Jul. 13, 2021

(54) MEMORY SYSTEM AND OPERATION METHOD FOR DETERMINING AVAILABILITY BASED ON BLOCK STATUS

(71) Applicant: SK hynix Inc., Gyeonggi-do (KR)

(72) Inventor: Jong-Min Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 46 days.

(21) Appl. No.: 16/375,671

(22) Filed: Apr. 4, 2019

(65) Prior Publication Data

US 2020/0050368 A1    Feb. 13, 2020

(30) Foreign Application Priority Data

Aug. 13, 2018  (KR) .......................... 10-2018-0094529

(51) Int. Cl.
*G06F 12/00* (2006.01)
*G06F 3/06* (2006.01)
*G06F 12/1009* (2016.01)

(52) U.S. Cl.
CPC ............ *G06F 3/064* (2013.01); *G06F 3/0611* (2013.01); *G06F 3/0652* (2013.01); *G06F 3/0658* (2013.01); *G06F 3/0679* (2013.01); *G06F 12/1009* (2013.01)

(58) Field of Classification Search
CPC ...... G06F 3/064; G06F 3/0611; G06F 3/0652; G06F 3/0658; G06F 3/0679; G06F 12/1009; G06F 3/0238; G06F 3/0246
See application file for complete search history.

(56) References Cited

U.S. PATENT DOCUMENTS

2018/0247696 A1\*  8/2018  Takizawa ............ G06F 12/0246

FOREIGN PATENT DOCUMENTS

| KR | 10-2014-0104189 | 8/2014 |
| KR | 10-2014-0142035 | 12/2014 |

\* cited by examiner

*Primary Examiner* — Shawn X Gu
(74) *Attorney, Agent, or Firm* — IP & T Group LLP

(57) ABSTRACT

A memory system includes a non-volatile memory device including at least one memory blocks storing a data and a controller coupled to the non-volatile memory device. The controller can perform at least one program operation or at least one erase operation within the at least one memory block. The controller can recognize an operation status of the at least one memory block in response to a time consumed for completing the at least one operation, and determine whether the at least one memory block is used and which priority is given to the at least one memory block based at least on the operation status so that the at least one memory block is allocated for a following operation.

18 Claims, 14 Drawing Sheets

MEMORY SYSTEM AND OPERATION METHOD FOR DETERMINING AVAILABILITY BASED ON BLOCK STATUS

CROSS-REFERENCE TO RELATED APPLICATION

This patent application claims priority under 35 U.S.C. § 119(a) to Korean Patent Application No. 10-2018-0094529, filed on Aug. 13, 2018, the entire disclosures of each of which are incorporated herein by reference.

TECHNICAL FIELD

Exemplary embodiments of the invention relate to a memory system, and more particularly, to a memory system and a method of operating a memory system capable of determining whether to use a memory block included in a memory device based at least on a block status.

BACKGROUND

Recently, a paradigm for a computer environment has shifted into ubiquitous computing, which enables a computer system to appear anytime and everywhere. The use of portable electronic devices such as mobile phones, digital cameras, notebook computers and the like could be rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a non-volatile semiconductor memory device is advantageous in that it has excellent stability and durability because it has no mechanical driving part (e.g., a mechanical arm), and has high data access speed and low power consumption. Data storage devices having such advantages include a universal serial bus (USB) memory device, a memory card having various interfaces, a solid state drive (SSD) or the like.

SUMMARY

At least one of embodiments of the disclosure may provide a memory system, a data processing system, and an operation process or a method, which may quickly and reliably process data into a memory device by reducing operational complexity and performance degradation of the memory system and enhancing usage efficiency of the memory device.

At least one of embodiments of the disclosure may provide a memory system and a method of operating the memory system which may determine whether to use and prioritize memory blocks according to statuses of a plurality of memory blocks included in a memory device.

In addition, at least one of embodiments of the disclosure may provide an apparatus and method for analyzing state information of bad blocks in a memory device, when there is not enough available storage space in a memory device, to accord a priority and using the bad blocks based at least one the priority.

Further, at least one of embodiments of the disclosure may provide an apparatus and a method that may move data stored in bad block earlier than those stored in normal blocks during an operation for wear leveling or garbage collection operation after the bad blocks in a memory device are used for storing any data.

In an embodiment, a memory system may include a non-volatile memory device including at least one memory blocks storing a data, and a controller, coupled to the non-volatile memory device. The controller may perform at least one program operation or at least one erase operation within the at least one memory block, recognize an operation status of the at least one memory block in response to a time consumed for completing the at least one operation, and determine whether the at least one memory block is used and which priority is given to the at least one memory block based at least on the operation status. The at least one memory block may be allocated for a following operation.

The controller may suspend a use of the at least one memory block when the program operation or the erase operation is not completed. By way of example but not limitation, the time falls within a single cycle predetermined for the at least one program operation or the at least one erase operation, when the at least one operation is performed in a normal memory block.

By way of example but not limitation, the at least one program operation or the at least one erase operation may include a plurality of unit operations, and the time is determined by a check operation performed after each unit operation is done. The at least one memory block may have a first priority when the time falls within a predetermined range, a second priority when the time is shorter than the predetermined range, and a third priority when the time is longer than the predetermined range. The at least one memory block having one of the first priority, the second priority and the third priority may be available for the following operation. In accordance with an embodiment, the predetermined range may be dynamically determined based on an erase count of each memory block.

The controller may allocate the at least one memory block in a first order of the first priority, the second priority and the third priority for a following program operation. But, the controller may select the at least one memory block in a second order of the third priority, the second priority and the first priority for a following erase operation.

In another embodiment, the controller may assign a higher priority to the at least one memory block as the time is closer to a predetermined optimized time. For example, the at least one memory block having a higher priority is used first for a following program operation, but the at least one memory block having a lower priority is selected first for a following erase operation. Herein, the predetermined optimized time may be dynamically determined based on an erase count of each memory block.

In another embodiment, a method for controlling a memory system may include requesting at least one program operation or at least one erase operation to a memory device including a plurality of memory blocks including a plurality of pages, performing the at least one program operation or the at least one erase operation within the at least one memory block, recognizing an operation status of the at least one memory block in response to a time consumed for completing the at least one program operation or the at least one erase operation, and determining whether the at least one memory block is used and which priority is given to the at least one memory block based at least on the operation status so that the at least one memory block is allocated for a following operation.

The determining whether the at least one memory block is used may include suspending a use of the at least one memory block when the at least one program operation or the at least one erase operation is not completed.

When a memory block may be normal, the time may fall within a single cycle predetermined for the at least one program operation or the at least one erase operation.

The at least one program operation or the at least one erase operation may include a plurality of unit operations, and the time is determined by a check operation performed after each unit operation is done. The at least one memory block can have a first priority when the time falls within a predetermined range, a second priority when the time is shorter than the predetermined range, and a third priority when the time is longer than the predetermined range. The at least one memory block having one of the first priority, the second priority and the third priority may be available for the following operation.

By way of example but not limitation, the predetermined range may be dynamically determined based on an erase count of each memory block.

The determining whether the at least one memory block is used may include allocating the at least one memory block in a first order of the first priority, the second priority and the third priority for a following program operation, and selecting the at least one memory block in a second order of the third priority, the second priority and the first priority for a following erase operation.

The controller may assign a higher priority to the at least one memory block as the time is closer to a predetermined optimized time. The at least one memory block having a higher priority is used first for a following program operation. But, the at least one memory block having a lower priority is selected first for a following erase operation.

In another embodiment, a control apparatus for a memory system may include a memory interface, coupled to a memory device including a plurality of memory blocks including a plurality of pages, for performing at least one operation of a program operation within at least one page in at least one memory block among the plurality of memory blocks and an erase operation within the at least one memory block, a control logic for recognizing an operation status of the at least one memory block in response to a time consumed for completing the at least one operation and determining whether the at least one memory block is used and which priority is given to the at least one memory block based at least on the operation status, and a host interface, coupled to a host, for delivering a command or a data entered from the host into the control logic or delivering a data which is requested by the host and transmitted from the memory interface.

In another embodiment, a memory system may include a memory device including a plurality of memory blocks; and a controller suitable for: detecting not-good blocks among the plurality of memory blocks, each not-good block including at least one bad word line; allocating a memory block for a program or erase operation among the plurality of memory blocks based on the detected not-good blocks; and performing a program or erase operation on the allocated memory block.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
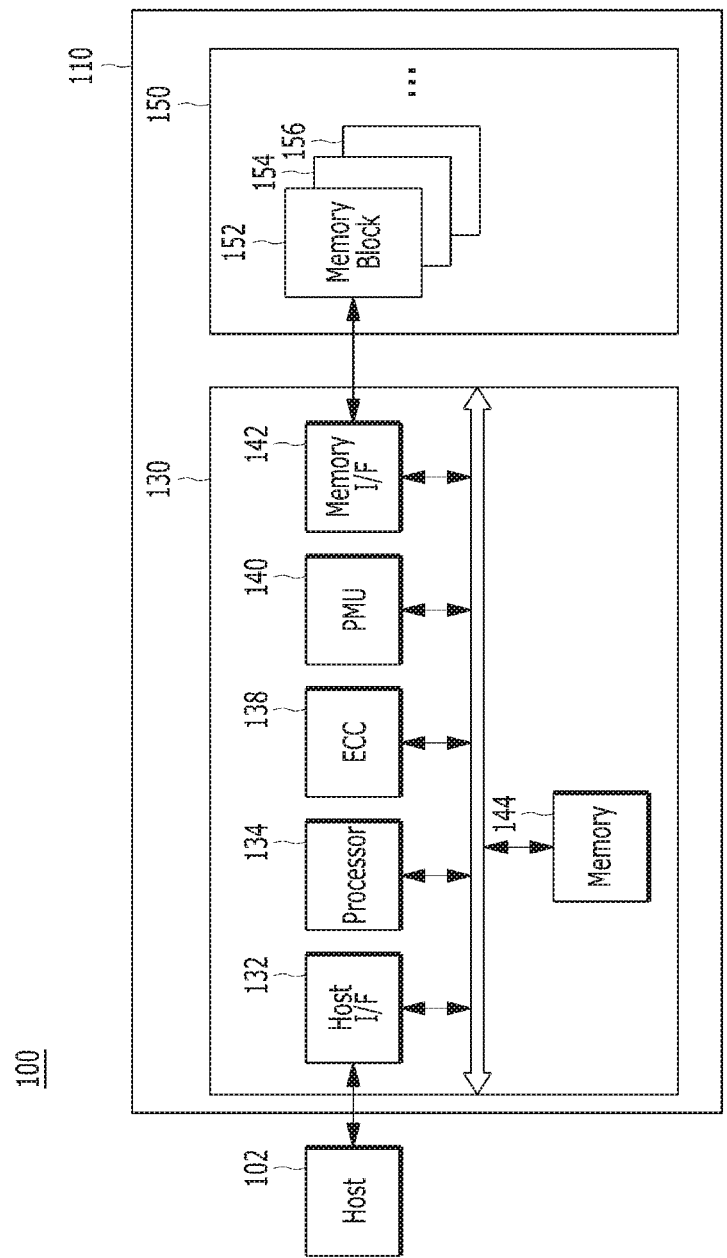
FIG. 1 shows an example of a data processing system including a memory system in accordance with an embodiment of the disclosure.

Various examples of the disclosure are described below in more detail with reference to the accompanying drawings. Elements and features of the present invention may be configured or arranged differently to form other embodiments, which may be variations of any of the disclosed embodiments. Thus, the present invention is not limited to the embodiments set forth herein. Rather, the described embodiments are provided so that this disclosure is thorough and complete and fully conveys the invention to those skilled in the art to which this invention pertains. Throughout the disclosure, like reference numerals refer to like parts throughout the various figures and examples of the disclosure. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could also be termed as a second or third element in another instance without departing from the spirit and scope of the invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention.

As used herein, singular forms are intended to include the plural forms and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure, it will be further understood that terms, such as those defined in commonly used dictionaries, should be interpreted as having a meaning that is consistent with their meaning in the context of the disclosure and the relevant art and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the disclosure will be described in detail with reference to the accompanied drawings.

In FIG. 1, a data processing system 100 in accordance with an embodiment of the disclosure is described. Referring to FIG. 1, the data processing system 100 may include a host 102 and a memory system 110. The host 102 may be coupled or linked with the memory system 110.

The host 102 may include, for example, a portable electronic device such as a mobile phone, an MP3 player and a laptop computer or an electronic device such as a desktop computer, a game player, a television (TV), a projector and the like.

The host 102 also includes at least one operating system (OS), which can generally manage, and control, functions and operations performed in the host 102. The OS can provide interoperability between the host 102 engaged with the memory system 110 and the user needing and using the memory system 110. The OS may support functions and operations corresponding to user's requests. By way of example but not limitation, the OS can be classified into a general operating system and a mobile operating system according to mobility of the host 102. The general operating system may be split into a personal operating system and an enterprise operating system according to system requirements or user's environment. The personal operating system, including Windows and Chrome, may be subject to support services for general purposes. But the enterprise operating systems can be specialized for securing and supporting high performance, including Windows servers, Linux, Unix and the like. Further, the mobile operating system may include an Android, an iOS, a Windows mobile and the like. The mobile operating system may be subject to support services or functions for mobility (e.g., a power saving function). The host 102 may include a plurality of operating systems. The host 102 may execute multiple operating systems linked with the memory system 110, corresponding to user's request. The host 102 may transmit a plurality of commands corresponding to user's requests into the memory system 110, thereby performing operations corresponding to commands within the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems as exemplified above.

By way of example but not limitation, the controller 130 and the memory device 150 may be integrated into a single semiconductor device. The controller 130 and memory device 150 configuring an SSD may be integrated into a single semiconductor device for improving an operation speed. When the memory system 110 is used as an SSD, the operating speed of the host 102 connected to the memory system 110 can be more improved than that of the host 102 implemented with a hard disk. In addition, the controller 130 and the memory device 150 integrated into one semiconductor device may form a memory card, i.e., a PC card (PCMCIA), a compact flash card (CF), a memory card such as a smart media card (e.g., SM, SMC), a memory sticks, a multimedia card (e.g., MMC, RS-MMC, MMCmicro), a SD card (e.g., SD, miniSD, microSD, SDHC), a universal flash memory and the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while an electrical power is not supplied. The memory device 150 may store data provided from the host 102 through a write operation, while providing data stored therein to the host 102 through a read operation. The memory device 150 may include a plurality of memory blocks 152, 154, 156. Each of the memory blocks 152, 154, 156 may include a plurality of pages. Each of the plurality of pages may include a plurality of memory cells to which a plurality of word lines (WL) are electrically coupled. The memory device 150 also includes a plurality of memory dies including a plurality of planes, each of which includes a plurality of planes, each of which includes a plurality of memory blocks 152, 154, 156. In addition, the memory device 150 may be a non-volatile memory device, for example a flash memory, wherein the flash memory may be a three-dimensional stack structure.

The controller 130 may control overall operations of the memory device 150, such as read, write, program and erase operations. For example, the controller 130 may control the memory device 150 in response to a request from the host 102. The controller 130 may provide the data, read from the memory device 150, with the host 102. The controller 130 may store the data, provided by the host 102, into the memory device 150.

The controller 130 may include a host interface (I/F) 132, a processor 134, an error correction code (ECC) unit 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In accordance with an embodiment, the host interface 132 is a component for exchanging data with the host 102, which may be implemented through a firmware called a host interface layer (HIL).

The ECC unit 138 may correct error bits of the data to be processed in (e.g., outputted from) the memory device 150, which may include an ECC encoder and an ECC decoder. Here, the ECC encoder may perform error correction encoding of data to be programmed in the memory device 150 to generate encoded data into which a parity bit is added and store the encoded data in memory device 150. The ECC decoder may detect and correct errors contained in a data read from the memory device 150 when the controller 130 reads the data stored in the memory device 150. In other words, after performing error correction decoding on the data read from the memory device 150, the ECC unit 138 may determine whether the error correction decoding has succeeded and output an instruction signal (e.g., a correction success signal or a correction fail signal). The ECC unit 138 may use the parity bit which is generated during the ECC encoding process, for correcting the error bit of the read data. When the number of the error bits is greater than or equal to a threshold number of correctable error bits, the ECC unit 138 may not correct error bits but may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all or some of circuits, modules, systems or devices for performing the error correction operation based on at least one of the above described codes.

The PMU 140 may manage an electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 may provide an interface for handling commands and data between the controller 130 and the memory device 150, for example, operations of NAND flash interface, in particular, operations between the controller 130 and the memory device 150. In accordance with an embodiment, the memory interface 142 may be implemented through a firmware called a flash interface layer (FIL) as a component for exchanging data with the memory device 150.

The memory 144 may support operations performed by the memory system 110 and the controller 130. The memory 144 may store temporary or transactional data for operations in the memory system 110 and the controller 130. The controller 130 may control the memory device 150 in response to a request from the host 102. The controller 130 may transfer data read from the memory device 150 to the host 102. The controller 130 may store data entered through the host 102 within the memory device 150. The memory 144 may be used to store data required for the controller 130 and the memory device 150 to perform operations such as read operations and/or program/write operations.

The memory 144 may be implemented with a volatile memory. The memory 144 may be implemented with a static random access memory (SRAM), a dynamic random access memory (DRAM) or both. Although FIG. 1 exemplifies the memory 144 disposed within the controller 130, neither this embodiment nor the invention is limited thereto. That is, the memory 144 may be located within or external to the controller 130. For instance, the memory 144 may be embodied by an external volatile memory having a memory interface transferring data and/or signals transferred between the memory 144 and the controller 130.

The memory 144 may store data necessary for performing operations such as data writing and data reading requested by the host 102 and/or data transfer between the memory device 150 and the controller 130 for background operations such as garbage collection, wear levelling as described above. In accordance with an embodiment, for supporting operations in the memory system 110, the memory 144 may include a program memory, a data memory, a write buffer or cache (buffer/cache), a read buffer/cache, a data buffer/cache, a map buffer/cache, and the like.

The processor 134 may be implemented with a microprocessor or a central processing unit (CPU). The processor 134 may represent more than one processor, all of which may be included in the memory system 110. The processor 134 may control the overall operations of the memory system 110. By way of example but not limitation, the processor 134 may control a program operation or a read operation of the memory device 150, in response to a write request or a read request entered from the host 102. In accordance with an embodiment, the processor 134 may use or execute firmware to control the overall operations of the memory system 110. Herein, the firmware may be referred to as a flash translation layer (FTL). The FTL may perform an operation as an interface between the host 102 and the memory device 150. The host 102 may transmit requests for write and read operations to the memory device 150 through the FTL.

The FTL may manage operations of address mapping, garbage collection, wear leveling and so forth. Particularly, the FTL may load, generate, update, or store map data. Therefore, the controller 130 may map a logical address, which is entered from the host 102, with a physical address of the memory device 150 through the map data. The memory device 150 may function as a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programmed page) due to a characteristic of a flash memory device. Further, the controller 130 may store map data of the new data into the FTL.

For example, for performing an operation requested from the host 102 in the memory device 150, the controller 130 uses the processor 134 implemented in a microprocessor or central processing unit (CPU) or the like. The processor 134 engaged with the memory device 150 may handle instructions or commands corresponding to an inputted command from the host 102. The controller 130 may perform a foreground operation as a command operation, corresponding to an command inputted from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation for the memory device 150 includes an operation (e.g., a garbage collection (GC) operation) for copying and storing data stored in a memory block among the memory blocks 152, 154, 156 in the memory device 150 to another memory block. The background operation may include an operation (e.g., a wear leveling (WL) operation) to move data stored in at least one of the memory blocks 152, 154, 156 in memory device 150 to one or more other memory blocks of the memory blocks 152, 154, 156. As the background operation, the controller 130 uses the processor 134 for storing the map data stored in the controller 130 to at least one of the memory blocks 152, 154, 156 in the memory device 150, e.g., a map flush operation. A bad block management operation for identifying bad blocks among the plurality of memory blocks 152, 154, 156 is another example of a background operation performed by the processor 134.

In the memory system 110, the controller 130 performs a plurality of command operations corresponding to a plurality of commands entered from the host 102. For example, when performing a plurality of program operations corresponding to plural program commands, a plurality of read operations corresponding to plural read commands and a plurality of erase operations corresponding to plural erase commands sequentially, randomly or alternatively, the controller 130 may determine which channel(s) or way(s) in a plurality of channels (or ways) for connecting the controller 130 to a plurality of memory dies included in the memory 150 is/are proper or appropriate for performing each operation. The controller 130 may send or transmit data or instructions via determined channels or ways for performing each operation. The plurality of memory dies included in the memory 150 may transmit an operation result via the same channels or ways, respectively, after each operation is complete. Then, the controller 130 may transmit a response or an acknowledge signal to the host 102. In an embodiment, the controller 130 may check a status of each channel or each way. In response to a command entered from the host 102, the controller 130 may select at least one channel or way based on the status of each channel or each way so that instructions and/or operation results with data may be delivered via selected channel(s) or way(s).

By way of example but not limitation, the controller 130 may recognize statuses regarding a plurality of channels (or ways) associated with a plurality of memory dies included in the memory device 150. The controller 130 may determine each channel or each way as one of a busy state, a ready state, an active state, an idle state, a normal state and/or an abnormal state. The controller 130 may determine which channel or way an instruction (and/or data) is transferred through and to which die the instruction (and/or the data) is transferred. The determination of the controller 130 may be associated with a physical block address. The controller 130 may refer to descriptors transferred from the memory device 150. The descriptors may include a block or page of parameters that describe characteristics or properties of the memory device 150. The descriptors may be data with a specific format or structure. For instance, the descriptors may include device descriptors, configuration descriptors, unit descriptors, and the like. The controller 130 may refer to, or use, the descriptors to determine which channel(s) or way(s) an instruction or data is exchanged via.

A management unit (not shown) may be included in the processor 134. The management unit may perform bad block management of the memory device 150. The management unit may find bad memory blocks in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 2:
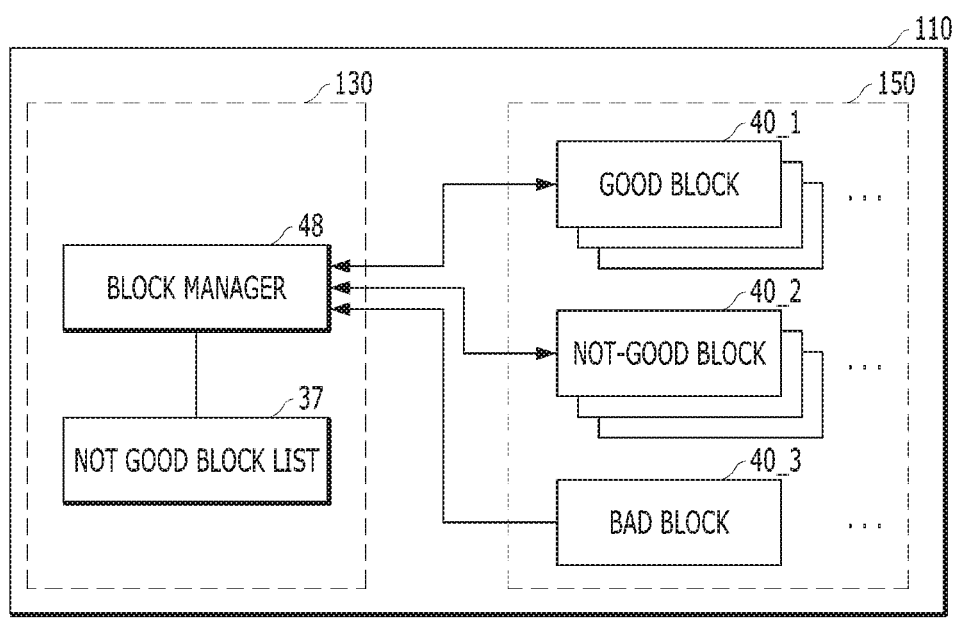
FIG. 2 illustrates an example of operations in a memory system in accordance with an embodiment of the disclosure.

In FIG. 2, an example of a memory system 110 in accordance with an embodiment of the disclosure is described. Referring to FIG. 2, the memory system 110 may include a controller 130 and a memory device 150. The memory system 110 may be coupled to another device, e.g., a computing device. The memory device 150 may include a non-volatile memory, and the controller 130 may program the externally transmitted data into the memory device 150 or read the externally requested data from the memory device 150.

The memory device 150 including the nonvolatile memory does not support overwriting that can overwrite data (e.g., write a new data to replace an old one) at the same position. Thus, the controller 130 in the memory system 110 may read data from a specific location of the memory device 150 and then should store the changed and updated data into another location of the memory device 150 when the corresponding data is changed or updated.

The memory system 110 may increase the number of blocks from which data can be erased data among a plurality of memory blocks in the memory device 150. The plurality of memory blocks may include at least one normal block 40_1 having a healthy or good status, at least one not-good block 40_2 having a not-good or unhealthy status, at least one bad block 40_3 having a bad status which indicates that a block might be not usable, and the like. Each block containing non-volatile memory cells may have inherent characteristics resulting from fabrication and have a finite lifetime. In each block, wear occurs in processes of writing and erasing data, which may result in differences in the characteristics of the non-volatile memory cells therein. The characteristics may be recognized based on operation information or status information of each block. The operation information or the status information may be generated and/or updated through processes of programming, reading, and erasing data in each block.

An operation for programming, reading, or erasing data in each block in the memory device 150 may be normally performed within a set time. When the operation of programming, reading, or erasing data in each block is not completed within a set time, the corresponding block may be considered a bad block 40_3. The bad block 40_3 is a block in which an operation is not normally completed. Thus, the controller 130 may not program a new data in the bad block 40_3 anymore. In accordance with an embodiment, when it can be determined that characteristics of the bad block 40_3 are improved or cured later while the memory system 110 is operating, the controller 130 may program data in that block.

The operation of programming, reading, or erasing data in each block in the memory device 150 may be completed within a set time which is relevant to an error, but not within a set range which is relevant to an operation status (e.g., healthy condition). By way of example but not limitation, a set allowable time for programming data is 20 millisecond (ms). When the memory system spends 19 ms on programming data in a specific block, this block may not be considered a bad block 40_3. However, if a set range for programming data in a good-conditioned block is 10 to 17 ms, a block in which data is programmed for 19 ms may be classified as a not-good block 40_2 instead of the bad block 403.

At least one not-good block 40_2 or at least one bad block 40_3 in the memory device 150 may be not used when a storage space in the memory device 150 is sufficient, that is, when the number of the plurality of normal blocks 40_1 is large. However, if there is insufficient storage space in the memory device 150, that is, if there is insufficient space to program data entered from the host 102, or there is not enough free blocks for operations such as garbage collection performed by the memory system 110, the memory system 110 may consider using at least one not-good block 40_2 or at least one bad block 40_3 in the memory device 150.

The controller 130 may include a block manager 48 that may monitor or manage operation or status information regarding a plurality of blocks in the memory device 150. The block manager 48 may generate a not-good block list 37 that may include operation information or status information regarding at least one not-good block 40_2 among the plurality of blocks in the memory device 150.

Although not shown, the block manager 48 may generate lists of normal blocks 40_1 and bad blocks 40_3. The block manager 48 may check the operation information or the status information regarding each block, and determine in which one of a normal block list, a not-good block list and a bad block list each block can be listed based on the operation information or the status information.

In accordance with an embodiment, the operation information or the status information may include an erase count, ECC information such as the number of errors and a recoverability, and a bad block identifier determined due to a fabricating fault. The operation information or the status information may be a criterion for the block manager 48 to determine which list a specific block is to be included.

When the block manager 48 determines that there are not enough normal blocks 40_1 in the memory device 150 for performing an operation requested by the host 102 or a background operation, the block manager 48 may refer to the not-good block list 37. The not-good block list 37 may include operation information or status information regarding at least one not-good block 40_2. The not-good block list 37 may include priorities, a priority assigned to each of the not-good blocks 40_2 based at least on the operation information or the status information of each block. The block manager 48 may determine which not-good block is to be used first among the plurality of not-good blocks 40_2 according to the priority.

In an embodiment, the block manager 48 may be implemented with at least one processor 134 and at least one memory 144 included in the controller 130 described in FIG. 1. By way of example but not limitation, the block manager 48 may use firmware or a program loaded in at least one memory 144, which is executed by at least one processor 134 included in the controller 130, to control or manage the operation information or the status information of each block.

Although not shown in FIG. 2, the controller 130 may perform various operations to increase or improve reliability of the memory system 110. For example, as briefly described, wear leveling is one of several operations to extend the lifetime (i.e., improving durability) of the memory system that can erase and write data in non-volatile memory cells, such as a solid state drive (SSD), a USB flash drive, and a phase change memory. Such a memory system may provide and fulfill a wear equalization mechanism that recognizes the extent to which a memory cell storing data is worn-out and provides various levels of life extension. This wear equalization mechanism may be applied to another operation such as garbage collection (GC) in which an occupied block is allowed to reuse (or program) new data by releasing unnecessary area (e.g., invalid data) from a memory area (e.g., blocks) dynamically allocated by a controller.

Further, after some of the not-good blocks 40_2 are already used, the block manager 48 may move the data stored in the not-good blocks 40_2 to the normal blocks 40_1 in the order of lower to higher priority through the background operation. This is because the lower the priority, the lower the stability of the data stored in the block. To this end, at least one normal block 40_1 in the memory device 150 should be secured so that data can be moved. Securement of the normal block 40_1 in the memory device 150 may be achieved through garbage collection.

During wear leveling or garbage collection, the memory system 110 may move the data between the normal blocks 40_1 or from a not-good block 40_2 to a normal block 40_1. By way of example but not limitation, the controller 130 may read data stored in a not-good block 40_2, load read data in the memory of the controller 130, and then store data loaded into the memory in the normal block 40_1, which is free block or open block. In the processes of moving data from the not-good block 40_2 in which the data is stored to the normal block 40_1 which is a free block, the controller 130 may load and update the metadata regarding the data to be moved and store updated metadata in the memory device 150.

Figure 3:
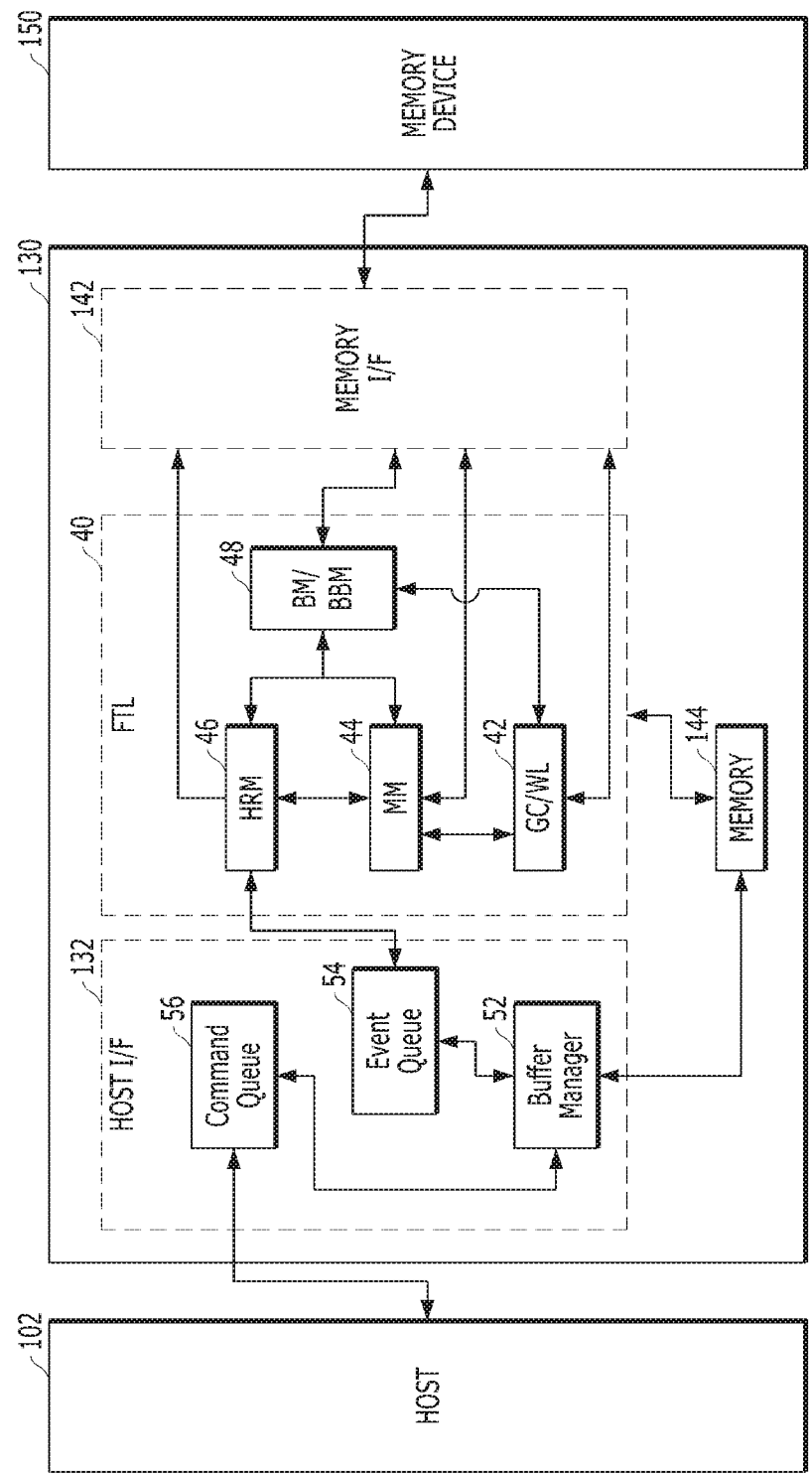
FIG. 3 illustrates an example of a memory system in accordance with an embodiment of the disclosure.

Referring to FIG. 3, a controller in a memory system in accordance with another example of the disclosure is described in detail. The controller 130 cooperates with the host 102 and the memory device 150. The controller 130 may include a host interface (I/F) 132, a flash translation layer (FTL) unit 40, a memory interface 142 and a memory 144.

Although not shown in FIG. 3, in accordance with an embodiment, the ECC unit 138 described in FIG. 2 may be included in the flash translation layer (FTL) unit 40. In another embodiment, the ECC unit 138 may be implemented as a separate module, a circuit, or a firmware, which is included in, or associated with, the controller 130.

The host interface 132 may handle commands, data, and the like transmitted from the host 102. By way of example but not limitation, the host interface 132 may include a command queue 56, a buffer manager 52 and an event queue 54. The command queue 56 may sequentially store commands, and data, transmitted from the host 102 and output them to the buffer manager 52 in a stored order. The buffer manager 52 may classify, manage or adjust the commands, and the data, which are transmitted from the command queue 56. The event queue 54 may sequentially transmit events for processing the commands, and the data, received from the buffer manager 52.

A plurality of commands or data having the same characteristic may be continuously transmitted from the host 102, or commands and data having different characteristics may be transmitted from the host 102 to the memory system 110 after being mixed or jumbled. For example, a plurality of commands for reading data (i.e., read commands) may be transmitted to the memory system 110, or commands for reading data (i.e., read command) and commands for programming/writing data (i.e., write command) may be alternately transmitted to the memory system 110. The host interface 132 may store commands, and data, which are received from the host 102, to the command queue 56 sequentially. Thereafter, the host interface 132 may estimate or predict what kind of operation the controller 130 will perform according to the characteristics of the command, or data, which is received from the host 102. The host interface 132 may determine a processing order and a priority of commands, and data, based at least on their characteristics. According to characteristics of commands, and data received from the host 102, the buffer manager 52 of the host interface 132 is configured to determine whether storing commands, and data in the memory 144, or whether transferring the commands, and the data to the flash translation layer (FTL) unit 40. The event queue 54 receives events, entered from the buffer manager 52, which are to be internally executed and processed by the memory system 110 or the controller 130 in response to the commands, and the data received from the host 102, so as to transfer the events into the flash translation layer (FTL) unit 40 in the order received.

In accordance with an embodiment, the host interface 132 described in FIG. 3 may perform the functions of the controller 130 described in FIG. 1. The host interface 132 may set a first memory included in the host 102 as a slave and add the first memory as an additional storage space which is controllable or usable by the controller 130.

In accordance with an embodiment, the flash translation layer (FTL) unit 40 may include a state manager 42, a map manager (MM) 44, a host request manager (HRM) 46 and a block manager 48. The host request manager (HRM) 46 may manage the events entered from the event queue 54. The map manager (MM) 44 may handle or control map data. The state manager (GC/WL) 42 may perform garbage collection (GC) or wear leveling (WL). The block manager 48 may execute commands or instructions onto a block in the memory device 150.

By way of example but not limitation, the host request manager (HRM) 46 may use the map manager (MM) 44 and the block manager 48 to handle or process requests according to the read and program commands and events which are received from the host interface 132. The host request manager (HRM) 46 may send an inquiry request to the map data manager (MM) 44, to figure out a physical address corresponding to the logical address which is entered with the events. The host request manager (HRM) 46 may send a read request with the physical address to the memory interface 142, to process the read request (or handle the events). On the other hand, the host request manager (HRM) 46 may send a program request (or write request) to the block manager 48, to program entered data to a specific page of the unrecorded (no data) in the memory device 150. Then, the host request manager (HRM) 46 may transmit a map update request corresponding to the program request to the map manager (MM) 44, to update an item relevant to the programmed data in information of mapping the logical-to-physical addresses to each other.

Here, the block manager 48 may convert a program request received from the host request manager (HRM) 46, the map data manager (MM) 44, and/or the state manager 42 into a flash program request used for the memory device 150, to manage flash blocks in the memory device 150. In order to maximize or enhance program or write performance of the memory system 110 of FIG. 2), the block manager 48 may collect program requests and send flash program requests for multiple-plane and one-shot program operations to the memory interface 142. The block manager 48 may send several flash program requests to the memory interface 142 to enhance or maximize parallel processing of the multi-channel and multi-directional flash controller (or the memory interface 142).

On the other hand, the block manager 48 may manage blocks in the memory device 150 according to the number of valid pages, select and erase blocks having no valid pages when a free block is needed, and select a block including the least valid page when it is determined that garbage collection is necessary. The state manager 42 may perform garbage collection to move the valid data to an empty block and erase the blocks containing the moved valid data so that the block manager 48 may have enough free blocks (or empty blocks with no data). If the block manager 48 provides information regarding a block to be erased to the state manager 42, the state manager 42 may check all pages of the block to be erased to determine whether each page is valid. For example, to determine validity of each page, the state manager 42 may identify a logical address recorded in an out-of-band (OOB) area of each page. To determine whether each page is valid, the state manager 42 may compare the physical address of the page with the physical address mapped to the logical address obtained from the inquiry request. The state manager 42 sends a program request to the block manager 48 for each valid page. A mapping table may be updated through the update of the map manager 44 when the program operation is complete.

The map manager 44 may manage a logical-to-physical mapping table. The map manager 44 may process requests such as queries, and updates, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request may be sent to the block manager 48 so that a clean cache block is made as well as the dirty map table may be stored in the memory device 150.

On the other hand, when garbage collection is performed, the state manager 42 copies valid page(s) into a free block, and the host request manager (HRM) 46 may program the latest version of the data for the same logical address of the page and currently issue an update request. When the state manager 42 requests the map update in a state in which copying of valid page(s) is not completed normally, the map manager 44 may not perform update of the mapping table. It is because the map request is issued with old physical information if the state manger 42 requests a map update and a valid page copy is completed later. The map manager 44 may perform a map update operation to ensure accuracy only if the latest map table still points to the old physical address.

The memory device 150 may include a plurality of memory blocks. The plurality of memory blocks may be classified into different types of memory blocks such as a single level cell (SLC) memory block, or a multi level cell (MLC) memory block, according to the number of bits that can be stored or represented in one memory cell of the corresponding memory block. Here, the SLC memory block includes a plurality of pages implemented by memory cells, each storing one bit of data. The SLC memory block may have high data I/O operation performance and high durability. The MLC memory block includes a plurality of pages implemented by memory cells, each storing multi-bit data (e.g., two bits or more). The MLC memory block may have larger storage capacity in the same space than the SLC memory block. The MLC memory block may be highly integrated in view of storage capacity. In an embodiment, the memory device 150 may be implemented with MLC memory blocks such as an MLC memory block, a triple level cell (TLC) memory block, a quadruple level cell (QLC) memory block and a combination thereof. The MLC memory block may include a plurality of pages implemented by memory cells, each capable of storing 2-bit data. The triple level cell (TLC) memory block may include a plurality of pages implemented by memory cells, each capable of storing 3-bit data. The quadruple level cell (QLC) memory block may include a plurality of pages implemented by memory cells, each capable of storing 4-bit data. In another embodiment, the memory device 150 may be implemented with a block including a plurality of pages implemented by memory cells, each capable of storing 5-bit or more bit data.

In an embodiment of the disclosure, the memory device 150 is embodied as a nonvolatile memory such as a flash memory or more specifically a NAND flash memory or a NOR flash memory. Alternatively, the memory device 150 may be implemented by any of a phase change random access memory (PCRAM), a ferroelectrics random access memory (FRAM), a spin injection magnetic memory (STT-RAM), and a spin transfer torque magnetic random access memory (STT-MRAM).

Figure 4:
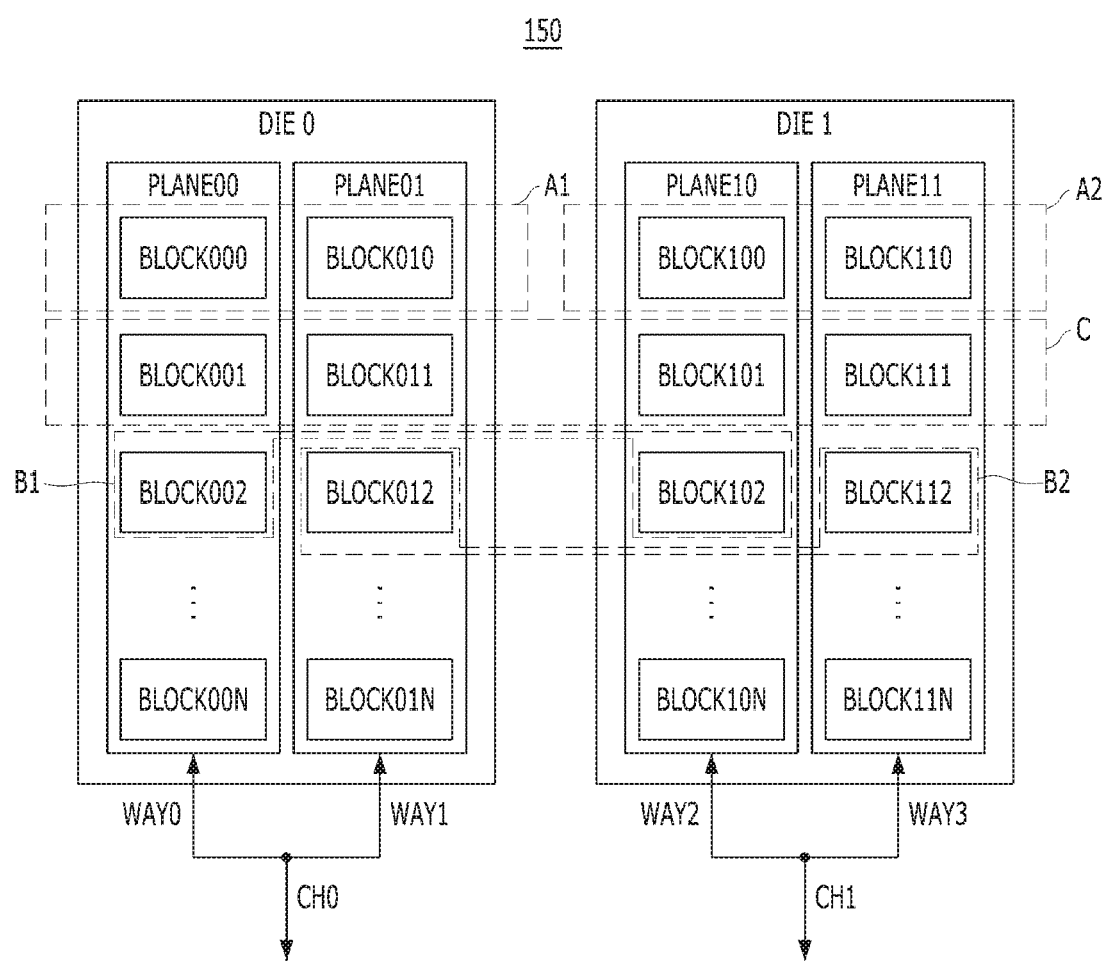
FIG. 4 shows an example of a super memory block used in a memory system in accordance with an embodiment of the disclosure.
Figure 5:
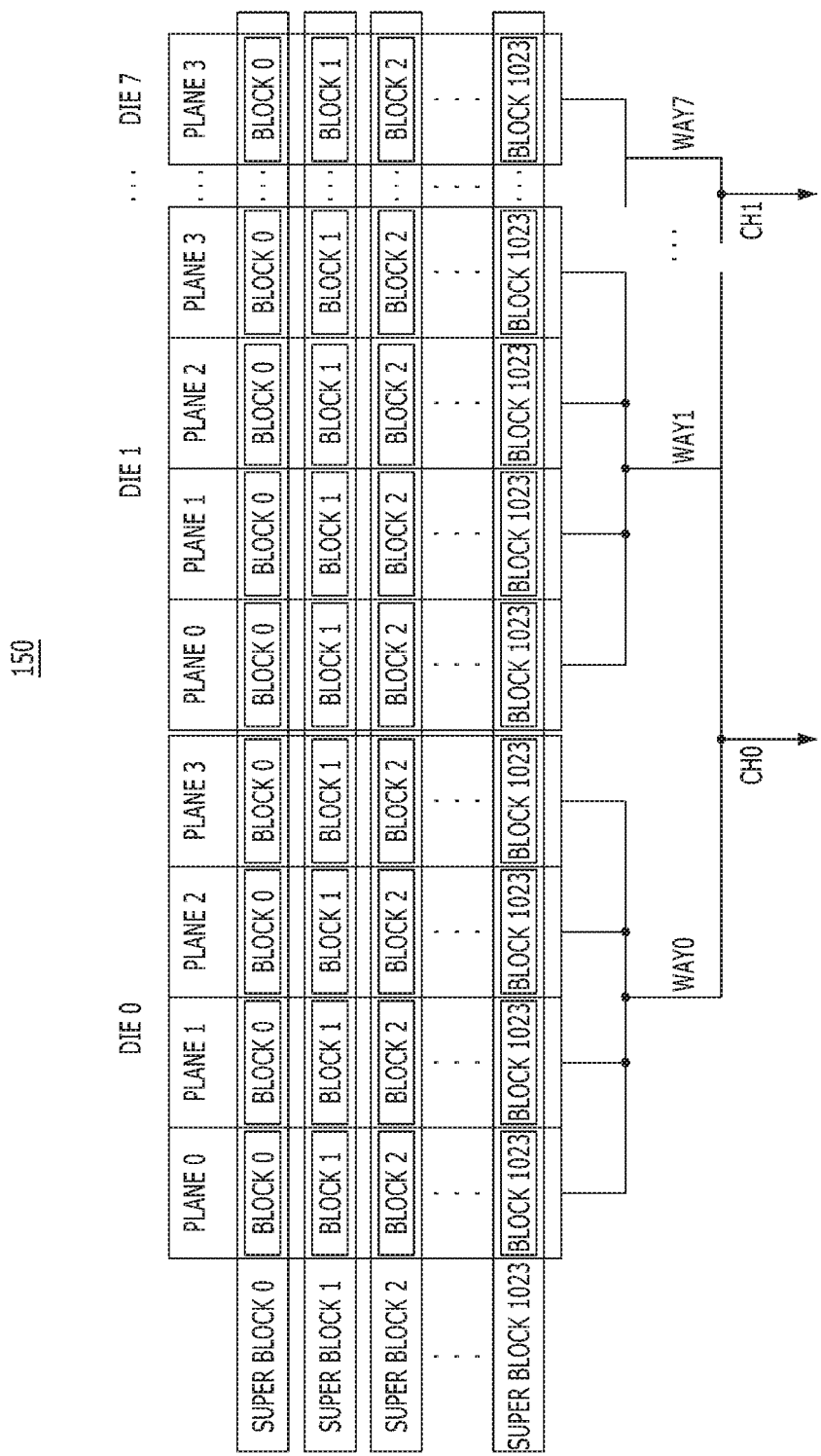
FIG. 5 illustrates an operation of controlling a super memory block in a memory system in accordance with an embodiment of the disclosure.

FIGS. 4 and 5 schematically illustrate an example of performing a plurality of command operations corresponding to a plurality of commands in the memory system in accordance with an embodiment of the disclosure. For example, detailed description is given for a data processing operation that encompasses multiple variations, e.g., a case where a plurality of write commands are received from the host 102 and program operations corresponding to the write commands are performed; another case where a plurality of read commands are received from the host 102 and read operations corresponding to the read commands are performed; another case where a plurality of erase commands are received from the host 102 and erase operations corresponding to the erase commands are performed; and another case where a plurality of write commands and a plurality of read commands are received together from the host 102 and program operations and read operations corresponding to the write commands and the read commands are performed.

Moreover, in an embodiment of the disclosure, a case is described in which write data corresponding to a plurality of write commands from the host 102 are stored in the buffer/cache included in the memory 144 of the controller 130, the write data stored in the buffer/cache are programmed to and stored in the plurality of memory blocks in the memory device 150, map data are updated in correspondence to the stored write data in the plurality of memory blocks, and the updated map data are stored in the plurality of memory blocks in the memory device 150. In an embodiment of the disclosure, a case is described in which program operations corresponding to a plurality of write commands from the host 102 are performed. Furthermore, in an embodiment of the disclosure, a case is described in which a plurality of read commands are from the host 102 for the data stored in the memory device 150, data corresponding to the read commands are read from the memory device 150 by checking the map data of the data corresponding to the read commands, the read data are stored in the buffer/cache included in the memory 144 of the controller 130, and the data stored in the buffer/cache are provided to the host 102. In other words, as an example, a case in which read operations corresponding to a plurality of read commands from the host 102 are performed is described. In addition, as an example, a case is described in which a plurality of erase commands are received from the host 102 for the memory blocks in the memory device 150, memory blocks are checked corresponding to the erase commands, the data stored in the checked memory blocks are erased, map data are updated in correspondence to the erased data, and the updated map data are stored in the plurality of memory blocks in the memory device 150. Namely, a case is described in which erase operations corresponding to a plurality of erase commands received from the host 102 are performed.

Further, while it will be described below as an example that the controller 130 performs command operations in the memory system 110, it is to be noted that, as described above, the processor 134 included in the controller 130 may perform command operations in the memory system 110, through, for example, a flash translation layer (FTL). Also, the controller 130 programs and stores user data and metadata corresponding to write commands from the host 102, in arbitrary memory blocks among the plurality of memory blocks in the memory device 150. Also, the controller 130 reads user data and metadata corresponding to read commands received from the host 102, from arbitrary memory blocks among the plurality of memory blocks in the memory device 150. Further, the controller 130 provides the read data to the host 102, or erases user data and metadata, corresponding to erase commands from the host 102, from arbitrary memory blocks among the plurality of memory blocks in the memory device 150.

Metadata may include first map data including logical/physical (L2P: logical to physical) information (logical information) and second map data including physical/logical (P2L: physical to logical) information (physical information), for data stored in memory blocks in correspondence to a program operation. Also, the metadata may include information on command data corresponding to a command received from the host 102, information on a command operation corresponding to the command, information on the memory blocks of the memory device 150 for which the command operation is to be performed, and information on map data corresponding to the command operation. In other words, metadata may include all remaining information and data excluding user data corresponding to a command received from the host 102.

That is to say, in the case where the controller 130 receives a plurality of write commands from the host 102, program operations corresponding to the write commands performed, and user data corresponding to the write commands written and stored in empty memory blocks, open memory blocks or free memory blocks for which an erase operation has been performed, among the memory blocks of the memory device 150. Also, first map data and second map data are written and stored in empty memory blocks, open memory blocks or free memory blocks among the memory blocks of the memory device 150. The first map data may include an L2P map table or an L2P map list in which logical information as the mapping information between logical addresses and physical addresses for the user data stored in the memory blocks are recorded. The second map data may include a P2L map table or a P2L map list in which physical information as the mapping information between physical addresses and logical addresses for the memory blocks stored with the user data are recorded.

In the case where write commands are received from the host 102, the controller 130 writes and stores user data corresponding to the write commands in memory blocks. The controller 130 stores, in other memory blocks, metadata including first map data and second map data for the user data stored in the memory blocks. Particularly, in correspondence to that the data segments of the user data are stored in the memory blocks of the memory device 150, the controller 130 generates and updates the L2P segments of first map data and the P2L segments of second map data as the map segments of map data among the meta segments of metadata. The controller 130 stores the map segments in the memory blocks of the memory device 150. The map segments stored in the memory blocks of the memory device 150 are loaded in the memory 144 included in the controller 130 and are then updated.

In the case where a plurality of read commands are received from the host 102, the controller 130 reads read data corresponding to the read commands, from the memory device 150, stores the read data in the buffers/caches included in the memory 144 of the controller 130. The controller 130 provides the data stored in the buffers/caches, to the host 102, by which read operations corresponding to the plurality of read commands are performed.

In the case where a plurality of erase commands are received from the host 102, the controller 130 checks memory blocks of the memory device 150 corresponding to the erase commands, and then, performs erase operations for the memory blocks.

When command operations corresponding to the plurality of commands received from the host 102 are performed while a background operation is performed, the controller 130 loads and stores data corresponding to the background operation, that is, metadata and user data, in the buffer/cache included in the memory 144 of the controller 130, and then stores the data, that is, the metadata and the user data, in the memory device 150. By way of example but not limitation, the background operation may include a garbage collection operation or a read reclaim operation as a copy operation, a wear leveling operation as a swap operation or a map flush operation, For instance, for the background operation, the controller 130 may check metadata and user data corresponding to the background operation, in the memory blocks of the memory device 150, load and store the metadata and user data stored in certain memory blocks of the memory device 150, in the buffer/cache included in the memory 144 of the controller 130, and then store the metadata and user data, in certain other memory blocks of the memory device 150.

In the memory system in accordance with an embodiment of the disclosure, in the case of performing command operations as foreground operations and a copy operation, a swap operation and a map flush operation as background operations, the controller 130 schedules queues corresponding to the foreground operations and the background operations and allocates the scheduled queues to the memory 144 included in the controller 130 and the memory included in the host 102. In this regard, the controller 130 assigns identifiers (IDs) by respective operations for the foreground operations and the background operations to be performed in the memory device 150, and schedules queues corresponding to the operations assigned with the identifiers, respectively. In the memory system in accordance with an embodiment of the disclosure, identifiers are assigned not only by respective operations for the memory device 150 but also by functions for the memory device 150, and queues corresponding to the functions assigned with respective identifiers are scheduled.

In the memory system in accordance with an embodiment of the disclosure, the controller 130 manages the queues scheduled by the identifiers of respective functions and operations to be performed in the memory device 150. The controller 130 manages the queues scheduled by the identifiers of a foreground operation and a background operation to be performed in the memory device 150. In the memory system in accordance with an embodiment of the disclosure, after memory regions corresponding to the queues scheduled by identifiers are allocated to the memory 144 in the controller 130 and the memory in the host 102, the controller 130 manages addresses for the allocated memory regions. The controller 130 performs not only the foreground operation and the background operation but also respective functions and operations in the memory device 150, by using the scheduled queues.

FIG. 4 is a diagram illustrating a super memory block used in a memory system in accordance with an embodiment.

Referring to FIG. 4, components in the memory device 150 among the components of the memory system 110 in accordance with the embodiment shown in FIGS. 1 to 3 are illustrated in detail.

The memory device 150 includes a plurality of memory blocks BLOCK000, BLOCK001, BLOCK002, . . . and BLOCK00N, BLOCK010, BLOCK011, BLOCK012, . . . and BLOCK01N, BLOCK100, BLOCK101, BLOCK102, . . . and BLOCK10N, and BLOCK110, BLOCK111, BLOCK112, . . . and BLOCK11N.

The memory device 150 includes plural memory dies, which may be coupled with the controller 130 (see FIG. 1) via different channels for data transmission. By way of example but not limitation, the memory device 150 includes a zeroth memory die DIE0 capable of inputting/outputting data through a zeroth channel CH0 and a first memory die DIE1 capable of inputting/outputting data through a first channel CH1. The zeroth channel CH0 and the first channel CH1 may input/output data in an interleaving scheme.

The zeroth memory die DIE0 includes a plurality of planes PLANE00, PLANE01 respectively corresponding to a plurality of ways WAY0, WAY1 capable of inputting/outputting data in the interleaving scheme by sharing the zeroth channel CH0.

The first memory die DIE1 includes a plurality of planes PLANE10, PLANE11 respectively corresponding to a plurality of ways WAY2, WAY3 capable of inputting/outputting data in the interleaving scheme by sharing the first channel CH1.

The first plane PLANE00 of the zeroth memory die DIE0 includes a set number of memory blocks BLOCK000, BLOCK001, BLOCK002, . . . and BLOCK00N among the plurality of memory blocks.

The second plane PLANE01 of the zeroth memory die DIE0 includes a set number of memory blocks BLOCK010, BLOCK011, BLOCK012, . . . and BLOCK01N among the plurality of memory blocks.

The first plane PLANE10 of the first memory die DIE1 includes a set number of memory blocks BLOCK100, BLOCK101, BLOCK102, . . . and BLOCK10N among the plurality of memory blocks.

The second plane PLANE11 of the first memory die DIE1 includes a set number of memory blocks BLOCK110, BLOCK111, BLOCK112, . . . and BLOCK11N among the plurality of memory blocks.

In this manner, the plurality of memory blocks in the memory device 150 may be grouped according to physical positions such as of using the same ways or the same channels.

By way of example but not limitation, it is illustrated in FIG. 4 that memory device 150 includes two memory dies DIE0, DIE1, and that two planes PLANE00, PLANE01 or PLANE10, PLANE11 are included in each of the memory dies DIE0, DIE1. According to design requirement or configuration, more or less than two memory dies may be included in the memory device 150. The number of planes that may be included in each memory die may also be more or less than two. The number of memory blocks in each plane may also be varied according to a system configuration.

The above-described scheme for grouping the plurality of memory blocks in the memory device 150 is based on physical positions or locations of the memory blocks. In another embodiment, the controller 130 may use a different scheme for grouping the plurality of memory blocks, which scheme may be on the basis of an operation or transaction that is performed on selected memory blocks. The controller 130 may arrange memory blocks in different locations such as different dies or different planes into plural groups, where each group contains memory blocks that are selected or configured simultaneously for an operation or transaction. The groups of memory blocks form respective super memory blocks.

How the controller 130 generates or establishes super memory blocks by grouping some of the plurality of memory blocks may be different according to a system configuration or a design requirement. Three different schemes will be described as examples.

A first scheme is to generate one super memory block A1 by grouping, by the controller 130, a single memory block BLOCK000 in the first plane PLANE00 and another single memory block BLOCK010 in the second plane PLANE01 of the zeroth memory die DIE0. When applying the first scheme to the first memory die DIE1, the controller 130 may generate one super memory block A2 by grouping a single memory block BLOCK100 in the first plane PLANE10 and a single memory block BLOCK110 in the second plane PLANE11 of the first memory die DIE1. In the first scheme, the controller 130 may select plural memory blocks in different planes of the same memory die to generate the super memory blocks A1, A2.

A second scheme is to generate one super memory block B1 by grouping, by the controller 130, a single memory block BLOCK002 included in the first plane PLANE00 of the zeroth memory die DIE0 and another single memory block BLOCK102 included in the first plane PLANE10 of the first memory die DIE1. For making another super memory block B2, the controller 130 may group one memory block BLOCK012 included in the second plane PLANE01 of the zeroth memory die DIE0 and one memory block BLOCK112 included in the second plane PLANE11 of the first memory die DIE1. In the second scheme, the controller 130 may select plural memory blocks in corresponding planes of different memory dies to configure the super memory blocks B1, B2.

A third scheme is to generate one super memory block C by grouping, by the controller 130, a memory block BLOCK001 included in the first plane PLANE00 of the zeroth memory die DIE0, another memory block BLOCK011 included in the second plane PLANE01 of the zeroth memory die DIE0, another memory block BLOCK101 included in the first plane PLANE10 of the first memory die DIE1, and another memory block BLOCK111 included in the second plane PLANE11 of the first memory die DIE1. In the third scheme, the controller 130 may choose a single block from each plane in every die to make the super memory block C.

For a specific operation or transaction, the controller 130 configures a super memory block from some of memory blocks, which are chosen or selected in different ways, e.g., an interleaving scheme. For example, the interleaving scheme may include a channel interleaving scheme, a memory die interleaving scheme, a memory chip interleaving scheme or a way interleaving scheme.

Figure 6:
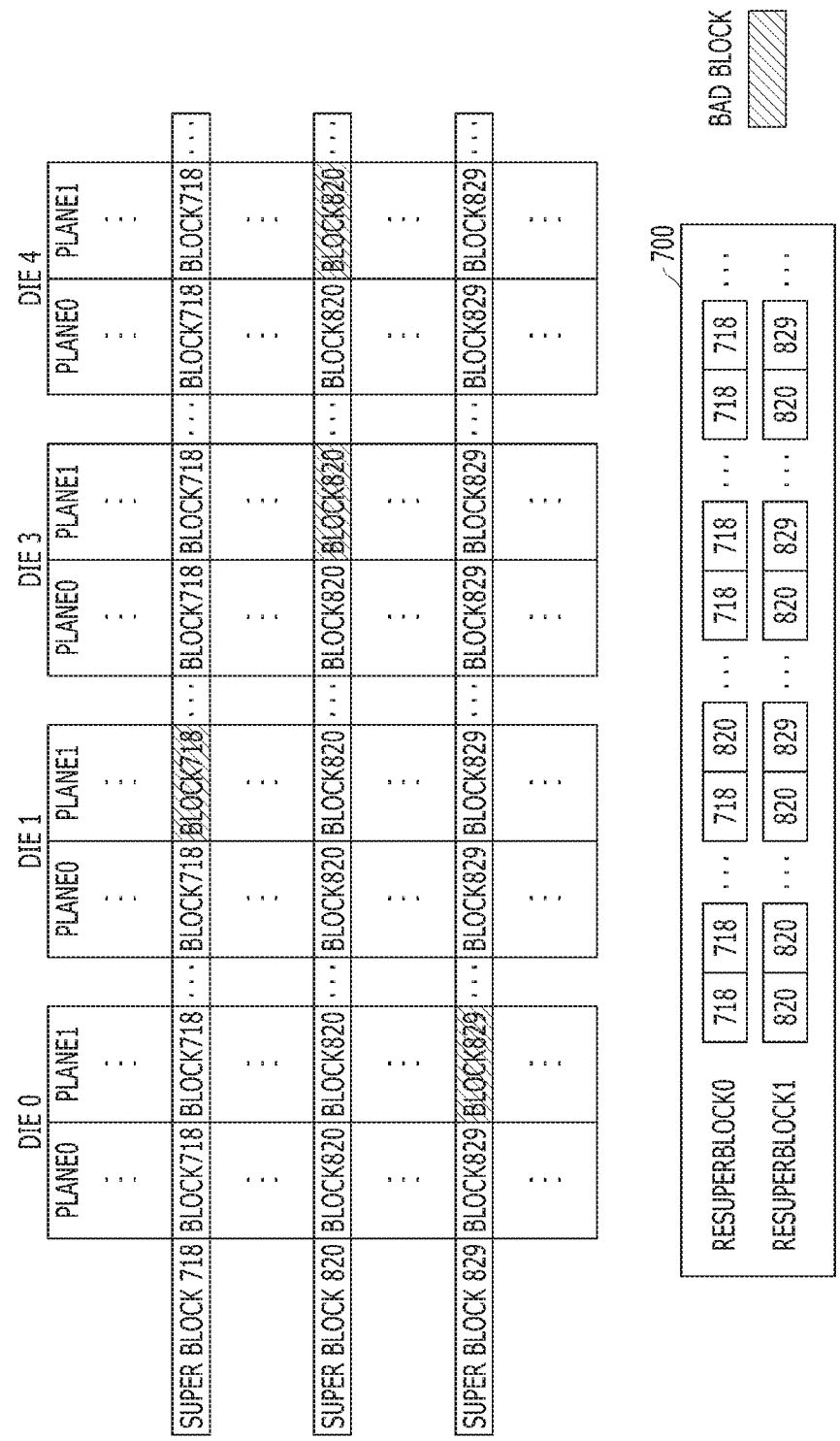
FIG. 6 illustrates an example of a method for reproducing a super memory block including some bad memory blocks of a memory system in accordance with an embodiment of the disclosure.

FIGS. 5 and 6 are diagrams illustrating an operation of managing memory blocks by the unit of a super memory block in the memory system in accordance with an embodiment.

Referring to FIG. 5, each of super memory blocks may be formed from a plurality of memory blocks in the memory device 150. The controller 130 may select some of memory blocks to establish each of super memory blocks from the plurality of memory blocks in the memory device 150.

It is assumed that the memory device 150 includes eight memory dies DIE<0:7>, each of the eight memory dies DIE<0:7> includes four planes PLANE<0:3> for a total 32 planes PLANE<0:3>*8, and each of the 32 planes PLANE<0:3>8 includes 1024 memory blocks BLOCK<0:1023>. In other words, it is exemplified that the memory device 150 includes total 32768 memory blocks BLOCK<0:1023>*32.

In the memory device 150, the total 32 planes PLANE<0:3>*8 included in the eight memory dies DIE<0:7> are arranged to input and output data through two channels CH<0:1> and eight ways WAY<0:7>. In detail, in the memory device 150, four ways of WAY<0:3> or WAY<4:7> may share one channel of CH0 or CH1. Four planes PLANE<0:3> may share one way of WAY0, WAY1, WAY2, WAY3, WAY4, WAY5, WAY6, or WAY7.

The controller 130 of the memory system 110 may group the plurality of memory blocks in the memory device 150 into super memory blocks to be assigned or allocated for transactions. Particularly, it may be seen that the controller 130 uses the third scheme to divide memory blocks into super memory blocks as described above with reference to FIG. 4.

The controller 130 may form each of the super memory blocks SUPERBLOCK<0:1023> by selecting a single memory block in each of 32 planes PLANE<0:3>*8 included in the memory device 150. Therefore, 32 memory blocks are included in each of the super memory blocks SUPERBLOCK<0:1023>.

Since the controller 130 simultaneously selects 32 memory blocks for each of the super memory blocks SUPERBLOCK<0:1023>, super memory block addresses (not shown) for selecting the respective super memory blocks SUPERBLOCK<0:1023> may be used in a configuration where the memory device 150 is handled by the unit of super memory block as in FIG. 5.

In this manner, to use the super memory block addresses, the controller 130 uses a scheme of generating super memory blocks by grouping memory blocks of the same positions in the respective 32 planes PLANE<0:3>*8 included in the memory device 150.

For example, the controller 130 may generate a zeroth super memory block SUPERBLOCK0 by grouping 32 zeroth memory blocks BLOCK0 in the respective 32 planes PLANE<0:3>*8 included in the memory device 150, generate a first super memory block SUPERBLOCK1 by grouping 32 first memory blocks BLOCK1 in the respective 32 planes PLANE<0:3>*8, and generate a second super memory block SUPERBLOCK2 by grouping 32 second memory blocks BLOCK2 in the respective 32 planes PLANE<0:3>*8. In this manner, the controller 130 may manage or handle the total 1024 super memory blocks SUPERBLOCK<0:1023> established from the 32768 memory blocks BLOCK<0:1023>*32 included in the memory device 150.

The fact that the controller 130 manages the memory blocks BLOCK<0:1023>*32 by dividing them into the super memory blocks SUPERBLOCK<0:1023> may indicate that the controller 130 sets an access processing unit to a super memory block unit. Even though the controller 130 selects each of the super memory blocks SUPERBLOCK<0:1023> by using a super memory block address, it is unlikely that each memory block address for selecting each of the 32768 memory blocks BLOCK<0:1023>*32 included in the memory device 150 is used. However, each memory block address is continuously used in the controller 130. By way of example but not limitation, the fact that the controller 130 accesses the zeroth super memory block SUPERBLOCK0 through a zeroth super memory block address may show that 32 memory blocks corresponding to 32 zeroth memory blocks BLOCK0 of the respective 32 planes PLANE<0:4>*8 which are grouped into the zeroth super memory block SUPERBLOCK0 are accessed at once.

It may not be possible for all the memory blocks in the memory device 150 to operate normally. For example, after the memory device 150 is mounted in a system and used by a processor, a bad memory block which does not operate normally can occur among the plurality of memory blocks in the memory device 150. A specific memory block having poor durability may be determined as a bad memory block because it may not carry out a normal operation even though the memory device 150 has not reached its lifetime limit.

In the case where the controller 130 adopts the scheme of managing super memory blocks by grouping memory blocks of the same positions in the respective 32 planes PLANE<0:3>*8 included in the memory device 150 to use super memory block addresses (not shown), it may not be possible to set the super memory block as an access processing unit for a super memory block including a bad memory block, among the super memory blocks SUPERBLOCK<0:1023>. It might generate an error that the controller 130 accesses a super memory block including a bad memory block without recovery, substitution or replacement.

For example, when only one memory block is a bad memory block and all the remaining 31 memory blocks are good and stable among the 32 memory blocks in any one super memory block among the super memory blocks SUPERBLOCK<0:1023>, it is markedly inefficient to not set the access processing unit of the corresponding super memory block to a super memory block unit.

In consideration of this fact, in the memory system 110, a super memory block including at least one bad memory block may be reused, not discarded, by employing a regenerated super block table 700 as shown in FIG. 6.

Referring to FIG. 6, it may be seen that one or more memory blocks among the 32 memory blocks in each of the 718th super memory block SUPERBLOCK718, the 820th super memory block SUPERBLOCK820 and the 829th super memory block SUPERBLOCK829, among the plurality of super memory blocks SUPERBLOCK<0:1023> in the memory device 150 shown in FIG. 5, are determined as bad memory blocks.

In the 718th super memory block SUPERBLOCK718 the memory block in the first plane PLANE1 of the first memory die DIE1 is determined as a bad memory block and the remaining 31 memory blocks are good or stable memory blocks.

Also, in the 820th super memory block SUPERBLOCK820 the memory block in the first plane PLANE1 of the third memory die DIE3 and the memory block in the first plane PLANE1 of the fourth memory die DIE4 are determined as bad memory blocks and the remaining 30 memory blocks are good or stable memory blocks.

Moreover, in the 829th super memory block SUPERBLOCK829 the memory block included in the first plane PLANE1 of the zeroth memory die DIE0 is determined as a bad memory block and the remaining 31 memory blocks are good or stable memory blocks.

In this state, the controller 130 generates the regenerated super block table 700 for replacing the bad memory blocks in the respective 718th super memory block SUPERBLOCK718, 820th super memory block SUPERBLOCK820 and 829th super memory block SUPERBLOCK829, which are determined as bad super memory blocks, with good or stable memory blocks, thereby normally operating regenerated super memory blocks.

In detail, in order to reuse the 718th super memory block SUPERBLOCK718, the controller 130 should search for a memory block capable of replacing the bad memory block i in the first plane PLANE1 of the first memory die DIE1.

The controller 130 searches a super memory block in which at least one bad memory block is included, among the super memory blocks SUPERBLOCK<0:1023>. That is, the controller 130 may exclude from the search any super memory block including only good or stable memory blocks. Thus, the controller 130 may replace a super memory block including at least one bad memory block with another super memory block including at least one bad memory block, not with another super memory block including good or stable memory blocks only. For enhancing efficiency, a super memory block including good or stable memory blocks only may be not used as a substitute.

For recovering or curing the bad memory block in the 718th super memory block SUPERBLOCK718, the controller 130 may find the 820th super memory block SUPERBLOCK820 which includes two bad memory blocks. Then, the controller 130 checks whether the position of either of the bad memory blocks in the 820th super memory block SUPERBLOCK820 is the same as the position of the bad memory block in the 718th super memory block SUPERBLOCK718. That is, after finding a substitute super memory block for a specific super memory block, the controller 130 may check whether bad memory blocks in the specific super memory block and in the substitute super memory block locate in the corresponding position(s), e.g., in the same plane.

If both bad memory blocks exist in the same position, the 820th super memory block SUPERBLOCK820 is excluded from the search result, and the controller 130 finds another super memory block. Otherwise, the 820th super memory block SUPERBLOCK820 is determined as the target super memory block to be used as a substitute super memory block.

In FIG. 6, the bad memory block of the 718th super memory block SUPERBLOCK718 is positioned in the first plane PLANE1 of the first memory die DIE1, while the bad memory blocks of the 820th super memory block SUPERBLOCK820 are positioned in the first plane PLANE1 of the third memory die DIE3 and the first plane PLANE1 of the fourth memory die DIE4. In other words, the positions of the bad memory blocks in the 820th super memory block SUPERBLOCK820 do not overlap with the position of the bad memory block in the 718th super memory block SUPERBLOCK718. Both bad memory blocks in the 820th super memory block locate in different positions than that of the bad block in the 718th super memory block.

Therefore, the controller 130 determines the 820th super memory block SUPERBLOCK820 as the target, and generates the regenerated super block table 700 such that the memory block in the first plane PLANE1 of the first memory die DIE1 in the 820th super memory block SUPERBLOCK820 may be used in the 718th super memory block SUPERBLOCK718.

Namely, in order to replace the 718th super memory block SUPERBLOCK718, the controller 130 sets the first row of the regenerated super block table 700 as a zeroth regenerated super memory block RESUPERBLOCK0, and stores the block address values of 32 memory blocks for replacing the 718th super memory block SUPERBLOCK718.

Thus, in the values of the zeroth regenerated super memory block RESUPERBLOCK0 stored in the first row of the regenerated super block table 700, only a block address for indicating the memory block in the first plane PLANE1 of the first memory die DIE1 is the block address of the 820th super memory block SUPERBLOCK820, and all the remaining 31 block addresses are the block addresses of the 718th super memory block SUPERBLOCK718.

When the controller 130 accesses the 718th super memory block SUPERBLOCK718 after the regenerated super block table 700 is generated, the controller 130 may refer to the values of the zeroth regenerated super memory block RESUPERBLOCK0 stored in the first row of the regenerated super block table 700.

Then, in order to reuse the 820th super memory block SUPERBLOCK820, the controller 130 should search for memory blocks capable of replacing the memory block in the first plane PLANE1 of the first memory die DIE1, the bad memory block in the first plane PLANE1 of the third memory die DIE3 and the bad memory block in the first plane PLANE1 of the fourth memory die DIE4. Herein, the memory block in the first plane PLANE1 of the first memory die DIE1 is not a bad memory block, but assigned as a substitute for the bad memory block of the 718th super memory block SUPERBLOCK718.

The reason why memory blocks capable of replacing three memory blocks among the 32 memory blocks in the 820th super memory block SUPERBLOCK820 are searched for even though there are only two bad memory blocks in the 820th super memory block SUPERBLOCK820 is because one memory block of the 820th super memory block SUPERBLOCK820 is used to normally operate the 718th super memory block SUPERBLOCK718 as a regenerated super memory block. Namely, the reason resides in that, because the bad memory block is in the first plane PLANE1 of the first memory die DIE1 in the 718th super memory block SUPERBLOCK718, the regenerated super block table 700 is generated to use that memory block in the 820th super memory block SUPERBLOCK820.

Hence, in order to reuse the 820th super memory block SUPERBLOCK820, the controller 130 searches for a super memory block in which at least one bad memory block is included, among the super memory blocks SUPERBLOCK<0:1023>. Of course, the controller 130 excludes from the search any super memory block in which only good memory blocks are included.

As a result of the search, the controller 130 may identify the 829th super memory block SUPERBLOCK829 which includes one bad memory block. In this state, the controller 130 checks whether the position of the bad memory block in the 829th super memory block SUPERBLOCK829 is the same as the position of the bad memory block in the 718th super memory block SUPERBLOCK718 and the positions of the bad memory blocks in the 820th super memory block SUPERBLOCK820.

If the same position exists, the 829th super memory block SUPERBLOCK829 is excluded as a target, and another super memory block is searched for. Conversely, if the same position does not exist, the 829th super memory block SUPERBLOCK829 is determined as a target super memory block.

It can be seen in FIG. 6 that the position of the bad block, die and plane, in SUPERBLOCK829, does not coincide or overlap with the position of any of the bad blocks in SUPERBLOCK820 and SUPERBLOCK718.

Therefore, the controller 130 determines the 829th super memory block SUPERBLOCK829 as a substitute or target. Then, the controller 130 generates the regenerated super block table 700 such that the memory block in the first plane PLANE1 of the first memory die DIE1, the memory block in the first plane PLANE1 of the third memory DIE3 and the memory block in the first plane PLANE1 of the fourth memory die DIE4 among the 32 memory blocks in the 829th super memory block SUPERBLOCK829 may be used in the 820th super memory block SUPERBLOCK820.

Namely, in order to replace the 820th super memory block SUPERBLOCK820, the controller 130 sets the second row of the regenerated super block table 700 as a first regenerated super memory block RESUPERBLOCK1, and stores the respective block address values of 32 memory blocks for replacing the 820th super memory block SUPERBLOCK820.

Thus, in the values of the first regenerated super memory block RESUPERBLOCK1 stored in the second row of the regenerated super block table 700, only block addresses for indicating the memory block in the first plane PLANE1 of the first memory die DIE1, the memory block in the first plane PLANE1 of the third memory die DIE3 and the memory block in the first plane PLANE1 of the fourth memory die DIE4 are the block addresses of the 829th super memory block SUPERBLOCK829, and all the remaining 29 block addresses are the block addresses of the 820th super memory block SUPERBLOCK820.

In this way, because the regenerated super block table 700 is generated, when the controller 130 accesses the 820th super memory block SUPERBLOCK820, reference may be made to the values of the first regenerated super memory block RESUPERBLOCK1 stored in the second row of the regenerated super block table 700.

Then, in order to reuse the 829th super memory block SUPERBLOCK829, the controller 130 should search for memory blocks capable of replacing the bad memory block included in the first plane PLANE1 of the zeroth memory die DIE1, the memory block included in the first plane PLANE1 of the first memory die DIE1, the memory block included in the first plane PLANE1 of the third memory die DIE3 and the memory block included in the first plane PLANE1 of the fourth memory die DIE4 among the 32 memory blocks in the 829th super memory block SUPERBLOCK829.

The reason why memory blocks capable of replacing four memory blocks among the 32 memory blocks in the 829th super memory block SUPERBLOCK829 are searched for even though there is a bad memory block among the 32 memory blocks in the 829th super memory block SUPERBLOCK829 resides in that three memory blocks of the 829th super memory block SUPERBLOCK829 are used to normally operate the 820th super memory block SUPERBLOCK820 as a regenerated super memory block. Namely, the reason resides in that, because the bad memory block is included in the first plane PLANE1 of the first memory die DIE1 in the 718th super memory block SUPERBLOCK718 and the bad memory blocks are included in the first plane PLANE1 of the third memory die DIE3 and the first plane PLANE1 of the fourth memory die DIE4 in the 820th super memory block SUPERBLOCK820, the regenerated super block table 700 is generated to use the memory blocks in the first plane PLANE1 of the first memory die DIE1, the first plane PLANE1 of the third memory die DIE3 and the first plane PLANE1 of the fourth memory die DIE4 among the 32 memory blocks in the 829th super memory block SUPERBLOCK829.

Hence, in order to reuse the 829th super memory block SUPERBLOCK829, the controller 130 searches for another super memory block in which at least one bad memory block is included, among the super memory blocks SUPERBLOCK<0:1023>. The controller 130 excludes from the search any super memory block in which only good memory blocks are included.

It may be assumed that, as a result of the search, the controller 130 may not search for another super memory block including at least one bad memory block. In this case, the controller 130 does not reuse the 829th super memory block SUPERBLOCK829 because there is no substitute.

By using the regenerated super block table 700 as described above with reference to FIG. 6, even though bad memory blocks are included in the three super memory blocks SUPERBLOCK718, SUPERBLOCK820 and SUPERBLOCK829 among the super memory blocks SUPERBLOCK<0:1203>, it is possible to set an access processing unit to the super memory block unit for the two super memory blocks SUPERBLOCK718 and SUPERBLOCK820.

In the scheme as shown in FIG. 6, some super memory blocks SUPERBLOCK718 and SUPERBLOCK820 among the super memory blocks SUPERBLOCK718, SUPERBLOCK820 and SUPERBLOCK829 including bad memory blocks are normally used, and only the remaining super memory block SUPERBLOCK829 is not used.

However, even in the scheme as shown in FIG. 6, a super memory block, such as SUPERBLOCK829 incapable of being used, cannot help but exist, and the good memory blocks in the super memory block SUPERBLOCK829 incapable of being used cannot be used only by reason that they are not grouped by super memory block unit.

Figure 7:
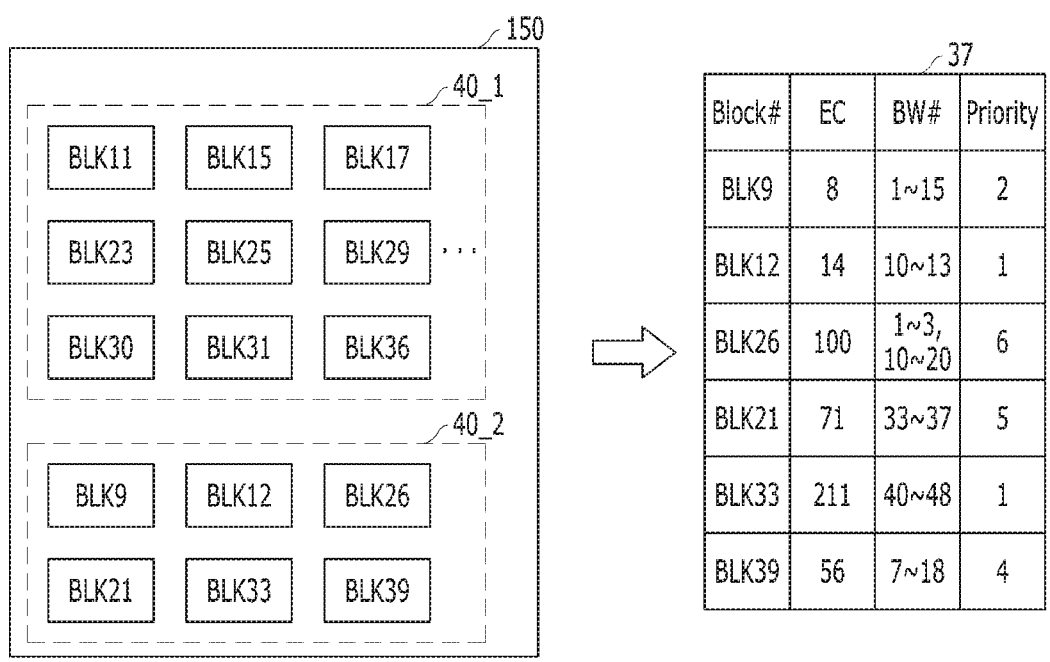
FIG. 7 illustrates an example of a list in accordance with an embodiment of the disclosure.

FIG. 7 illustrates an example of a not-good block list 37 of a memory device 150 in accordance with an embodiment of the disclosure.

Referring to FIG. 7, the memory device 150 may include a plurality of normal blocks 40_1 and a plurality of not-good blocks 40_2. The controller 130 shown in FIGS. 1 to 3 may store operation information and/or status information regarding the plurality of not-good blocks 40_2, determine a priority based on the stored information, and generate the not-good block list 37.

The not-good block list 37 may include information regarding at least one block considered the not-good block 40_2 among the plurality of memory blocks in the memory device 150. For example, the not-good block list 37 may include a block location (Block #), an erase count (EC), a bad word line location (BW #), and a priority.

A method for classifying a specific block included in the memory device 150 as the not-good block 40_2 may be implemented in various ways in accordance with various embodiments. For example, a criterion used to determine whether a specific block is the not-good block 40_2 may be based on a time consumed for programming data in the specific block, a time required for erasing data stored in the specific block, a count of bad word lines included in the specific block, and/or a count of bad unit cells included in the specific block. For example, if there is at least one bad word line included in a block, the block may be regarded as a not-good block. In accordance with an embodiment, the controller 130 may use a single criterion or any combination of criteria to determine whether a block in the memory device 150 is considered a not-good block 40_2.

In addition, the not-good block list 37 may include a priority determined based on information such as a block position (block #), an erase count EC, and/or a bad word line position BW #. The priority included in the not-good block list 37 may be determined in accordance with various embodiments. The controller 130 may determine a priority based on various information about a specific block classified as a not-good block to consider whether that block can be efficiently used for a following operation. For example, if a time required to program or erase data in a specific block does not fall within a normal range but is not a failure (does not fall within a failure range which is a longer time than the normal range), the block may be used for the following operation. On the other hand, if there are very few (e.g., one) bad word lines in a specific block, but the number of times the block has been used is small (e.g., the erase count is very small), another region of that block, i.e., a region that does not contain the bad word line, may have few or no defects. Even in this case, that not-good block may be given a relatively higher priority.

Although not shown, in accordance with an embodiment, the not-good block list 37 may include information regarding not-good blocks as well as bad blocks. The bad blocks may be given a lower priority than the not-good block.

Figure 8:
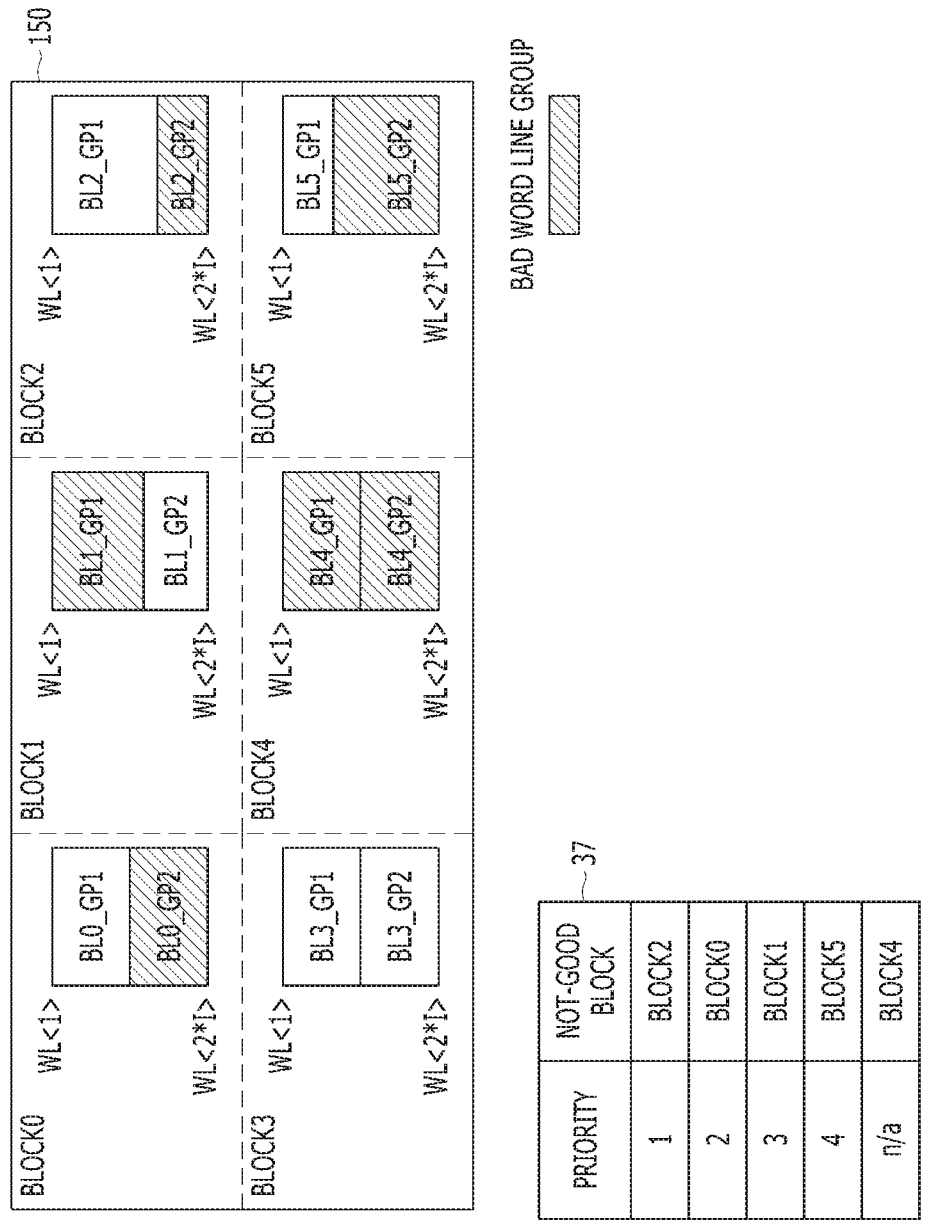
FIG. 8 shows an example of a control method for determining whether a bad block is used and/or determining a priority for reusing the bad block in a memory system in accordance with an embodiment of the disclosure.

In accordance with an embodiment, a memory block including a bad word line as shown in FIG. 8 may be reused. For example, if a specific memory block includes a bad word line, data may be stored in memory cells connected to other normal word lines except for the corresponding bad word line.

FIG. 8 illustrates a control method, which can determine whether a not-good block and/or a bad block are used and which priority is given to the not-good block and/or the bad block for another following operation.

Referring to FIG. 8, a super memory block exemplified in FIGS. 4 to 6 is not shown, but a plurality of memory blocks BLOCK <0:5> included in the memory device 150 illustrated in FIGS. 1 to 3 is shown. However, this embodiment may be applicable to a super memory block scheme shown in FIGS. 4 to 6 or a block-by-block basis scheme shown in FIGS. 1 to 3.

Specifically, each of plural memory blocks BLOCK<0:5> in the memory device 150 may include a plurality of word lines WL<0:2*I>. Each of the word lines WL<0:2*I> may be split into plural groups including 'N' number of word line groups BL<0:5>_GP<1:2>.

For example, it is shown that six memory blocks BLOCK<0:5> are included in the memory device 150. According to configuration or design of the memory system, the memory device 150 may include more or fewer memory blocks. In FIG. 8, each of the memory blocks BLOCK<0:5> may include two word line groups BL<0:5>_GP<1:2>. Herein, 'N' is 2. However, depending on configuration or design of the memory system, 'N' may be any natural number greater than two.

Although not shown in FIG. 8, the controller 130 (see FIGS. 1 to 3) may collect information regarding the 'M' number of not-good or bad memory blocks BLOCK <0:2, 4:5>, including at least one bad word lines, among the memory blocks BLOCK<0:5> included in the memory device 150.

In this case, at least one bad word line is included only in the five memory blocks BLOCK<0:2,4:5> among the six memory blocks BLOCK<0:5> included in the memory device 150. No bad word line is included in memory block BLOCK<3>. Accordingly, the controller 130 may determine the five memory blocks BLOCK<0:2,4:5> including the at least one bad word line as either a not-good block or a bad memory block. The not-good block list 37 may include five items regarding each of the five memory blocks BLOCK<0: 2,4:5>. However, depending on the number of memory blocks including bad word lines, the number of items in the not-good block list 37 may be greater or less than five. In FIG. 8, the not-good block list 37 includes information regarding the five memory blocks BLOCK<0:2,4:5> which includes at least one bad word line.

On the other hand, the block BLOCK<3> that does not include any bad word line may be considered a normal block. However, it is possible that block BLOCK<3> could be classified as a not-good block, which may occur when a time spent on programming or erasing data in the block BLOCK<3> does not fall within a normal range, in which case the controller 130 may determine the block BLOCK<3> as a not-good block notwithstanding that there is no bad word line therein. That is, it is plausible that the block BLOCK<3> may be considered a not-good block based on its operation status or a determination way in accordance with an embodiment.

The controller 130 may generate and control a not-good block list 37 that can list the not-good blocks BLOCK<0: 2,4:5> separately. The controller 130 may determine whether to use for another operation according to an operation status of the not-good memory block. Here, the operation status may indicate whether the data program operation and/or the data erase operation can be performed properly within a set cycle. For example, when the controller 130 performs a data program operation to plural pages included in a memory block, the controller 130 may determine that this memory block can be considered a normal memory block and used for another operation if a time for completing the data program operation falls in the normal range. However, if the time is shorter or longer than the normal range, the corresponding memory block may be determined as a not-good block and may be included in the not-good block list 37, and a priority may also be given.

On the other hand, whether a time consumed for completing a data program operation in a specific block falls within the normal range may depend upon whether there is at least one bad word line in the memory block.

The third memory block BLOCK<3> determined as a normal memory among the memory blocks BLOCK<0:5> in FIG. 8 has no bad word line among the word lines WL<1:2*I> so that an operation status for the data program operation or the data erase operation may be performed along with a normal range. But, each of the not-good memory blocks BLOCK<0:2,4:5> include bad word lines. Bad word line groups (e.g., bad word line regions) are larger in the order of the fourth memory block BLOCK<4>, the fifth memory block BLOCK<5>, the first memory block BLOCK<1>, the zeroth memory block BLOCK<0> and the second memory block BLOCK<2>. Thus, priorities are given from high to low in the reverse order, that is, in the order of the second memory block BLOCK<2>, the zeroth memory block BLOCK<0>, the first memory block BLOCK<1>, the memory block BLOCK<5> and the fourth memory block BLOCK<4>.

On the other hand, in accordance with an embodiment, the fourth memory block BLOCK<4> in which all the word lines are bad may not be given a priority (for example, n/a). In this case, the use of the fourth memory block BLOCK<4>, in which all the word lines are bad, may be suspended.

The controller 130 may use the not-good block list 37 to control the bad memory blocks BLOCK<0:2,4:5> so that at least one of the not-good or bad memory blocks BLOCK<0: 2,4:5> is not used under a normal situation or condition. However, an emergency may occur when there are few free blocks in the memory device 150. In such a case, at least one of the not-good or bad memory blocks BLOCK<0:2,4:5> may be used for a following operation. The controller 130 may preferentially use a not-good memory block having a higher priority among all of the not-good or bad memory blocks BLOCK<0:2,4:5>, referring to the not-good block list 37. When the not-good memory block is used, the controller 130 determines normal word line groups BL0_GP1, BL1_GP2, BL2_GP1, BL5_GP1 except for the bad word line group BL0_GP2, BL1_GP1, BL2_GP2, BL4_GP1, BL4_GP2, BL5_GP2 in the not-good memory blocks BLOCK<0:2,4:5>. Thereafter, after using the not-good or bad memory blocks BLOCK<0:2,4:5> for programming data based on the priority, these blocks are selected in the reverse order of the priority for garbage collection (GC).

On the other hand, the not-good block list 37 may include the information on not-good or bad memory blocks BLOCK<0:2,4:5> in a form of a bitmap or an index pool which may indicate the not-good or bad memory blocks BLOCK<0:2,4:5>.

As described above, the controller 130 may recognize or detect not-good blocks or bad memory blocks BLOCK <0:2,4:5>, including at least one bad word line, in the plurality of memory blocks BLOCK<0:5>, and control those detected blocks not to be used during a case of normal situation or operation. However, in a case where a free memory block is not enough, it is necessary to allocate at least one of the not-good blocks or bad blocks BLOCK<0: 2,4:5> in a descending order of priority for a following operation.

Figure 9:
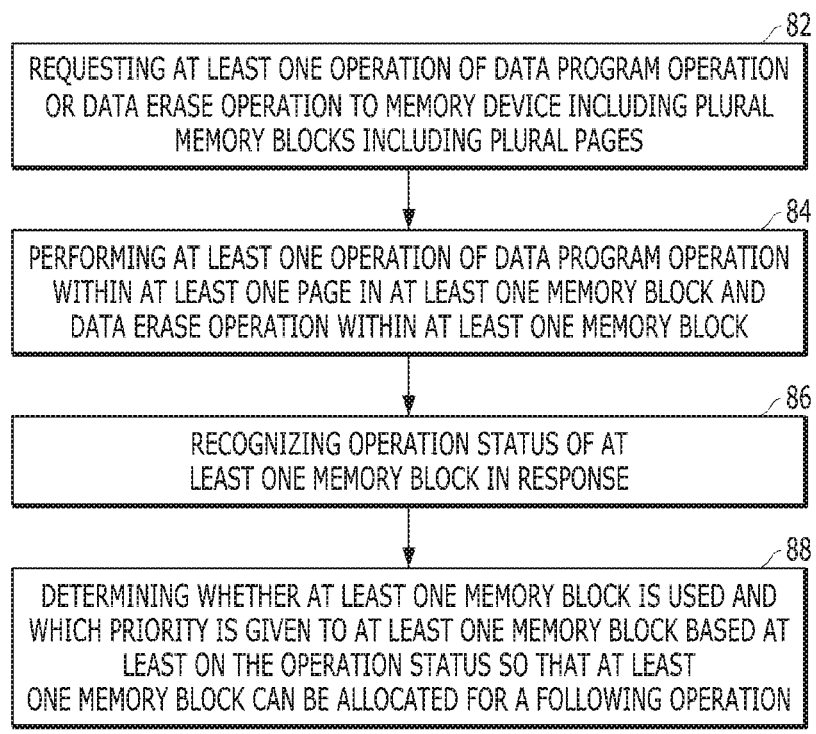
FIG. 9 illustrates an example of a method for controlling a memory system in accordance with another embodiment of the disclosure.

FIG. 9 illustrates a method of operating a memory system in accordance with an embodiment of the disclosure.

Referring to FIG. 9, an operation or control method may include steps 82, 84, 86, 88. Step 82 includes requesting at least one data program operation or at least one data erase operation to a memory device including plural memory blocks including plural pages. Step 84 includes performing the requested operation. When the data program operation is requested, it is performed within at least one page in a memory block, and when the data erase operation is requested, it is performed within at least one memory block. Step 86 includes recognizing or detecting an operation status of the memory block(s) in response to a time consumed for completing the operation performed. Step 88 includes determining whether the memory block(s) may be used and which priority may be given to the memory block(s) based at least on the operation status so that the memory block(s) can be allocated for a following operation.

Although not shown, the step for determining whether the memory block(s) may be used may include suspending use of each memory block when the program operation or the erase operation performed on it is not completed. For example, a controller may recognize that the program operation or the erase operation may be not completed when the program operation or the erase operation is not terminated within a set cycle. The set cycle may be determined based at least on configuration of a memory device or a memory cell structure of the memory device.

On the other hand, the suspending of the use of a specific memory block may be performed to check whether the specific memory block includes at least one bad word line or how many bad word lines are included in the specific memory block, to determine that the specific memory block is considered a bad memory block or a not-good block.

In accordance with an embodiment, each such memory block may have a first priority when a time spent on completion of the program operation or the erase operation falls within a set range, a second priority when the time is shorter than the set range, and a third priority when the time is longer than the set range. Herein, the first priority is higher than the second priority, and the second priority is higher than the third priority. Each memory block having one of the first priority, the second priority and the third priority may be available for the following operation. In another embodiment, the controller may assign a higher priority to a memory block as the time is closer to an optimized time. For example, it can be estimated that a memory block having the first priority may have the least number of bad word lines among not-good blocks, and another block having the third priority may have the greatest number of bad word lines among the not-good blocks.

As described above, a memory block including a bad word line is determined as a not-good block, which may not be used or allocated for a following operation under a normal condition or situation. However, it is possible to temporarily use the not-good block when there are insufficient, or no, free blocks. When using at least one not-good block, the controller 130 may select a memory block having a higher priority among a plurality of not-good memory blocks, e.g., a memory block having the greatest number of normal word lines among the plurality of not-good memory blocks, referring to the not-good block list 37 shown in FIGS. 7 and 8. Then, the controller 130 may use the selected memory block for a following operation. Accordingly, it is possible to avoid allocating the not-good block for another operation under a normal situation, so that the not-good block may be used only in an exceptional situation (e.g., emergency). These processes may ensure operation stability of a memory system.

Figure 10:
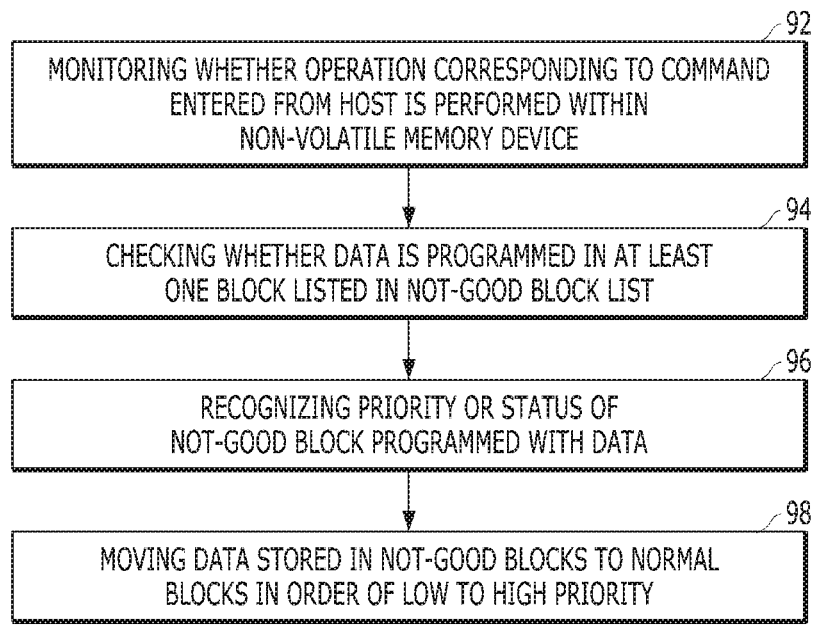
FIG. 10 illustrates an example of garbage collection using an abnormal block list in accordance with another embodiment of the disclosure.

FIG. 10 illustrates an operation of garbage collection using a not-good block list in accordance with an embodiment of the disclosure.

Referring to FIG. 10, a method for using a not-good block list to perform garbage collection may include steps 92, 94, 96 and 98. Step 92 includes monitoring whether an operation corresponding to a command received from a host is performed within a non-volatile memory device. This step is for checking an operation status of the non-volatile memory device. For example, when the non-volatile memory device is in an idle state, a controller may perform the operation of the garbage collection. Step 94 includes checking whether data is programmed in at least one not-good block listed in the not-good block list. Step 96 includes recognizing a priority or a status of each not-good block programmed with the data. Step 98 includes moving (or copying) the data stored in the not-good blocks to normal blocks in an ascending order of priority (i.e., from a low priority to a high priority).

As described above, when valid data is programmed within a not-good block or a bad block included in the not-good block list, the stability of the data may be significantly lower than that stored in a normal block. Thus, if there is a chance that the data may be moved to the normal block of the memory device, the controller may move the valid data stored in the not-good block or the bad block into the normal block. The controller may check the priority of the not-good block used for storing the valid data, and move the valid data stored in the not-good block having a lower priority to the normal block first. In accordance with an embodiment, when the number of normal blocks in the memory device is enough, it is also possible to move the valid data stored in some of not-good blocks into the normal blocks.

After moving the valid data stored in the not-good block into the normal blocks, metadata or map data corresponding to the data may be updated. In another embodiment, when the data is stored in a super block scheme described in FIGS. 4 to 6, metadata or map data of the corresponding super block may be updated together.

Figure 11:
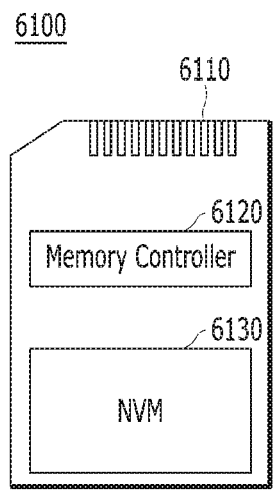
FIGS. 11 to 19 schematically illustrate other examples of data processing systems including a memory system in accordance with embodiments of the disclosure.

In FIG. 11, another example of the data processing system including the memory system in accordance with an embodiment is described. FIG. 11 schematically illustrates a memory card system 6100 to which the memory system is applied.

Referring to FIG. 11, the memory card system 6100 may include a memory controller 6120, a memory device 6130 and a connector 6110.

The memory controller 6120 may be connected to the memory device 6130 embodied by a nonvolatile memory (NVM). The memory controller 6120 may be configured to access the memory device 6130. By way of example but not limitation, the memory controller 6120 may be configured to control read, write, erase and background operations of the memory device 6130. The memory controller 6120 may be configured to provide an interface between the memory device 6130 and a host, and use firmware for controlling the memory device 6130. That is, the memory controller 6120 may correspond to the controller 130 of the memory system 110 described with reference to FIGS. 1 and 3, and the memory device 6130 may correspond to the memory device 150 of the memory system 110 described with reference to FIGS. 1 and 5.

Thus, the memory controller 6120 may include a random access memory (RAM), a processing unit, a host interface, a memory interface and an error correction unit. The memory controller 130 may further include the elements shown in FIGS. 1 and 3.

The memory controller 6120 may communicate with an external device, for example, the host 102 of FIG. 1 through the connector 6110. For example, as described with reference to FIGS. 1 to 3, the memory controller 6120 may be configured to communicate with an external device under one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), integrated Drive Electronics (IDE), Firewire, universal flash storage (UFS), WiFi and Bluetooth. Thus, the memory system and the data processing system may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may be so integrated to construct a solid state driver (SSD). Also, the memory controller 6120 and the memory device 6130 may be so integrated to construct a memory card such as a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC) and/or a universal flash storage (UFS).

Figure 12:
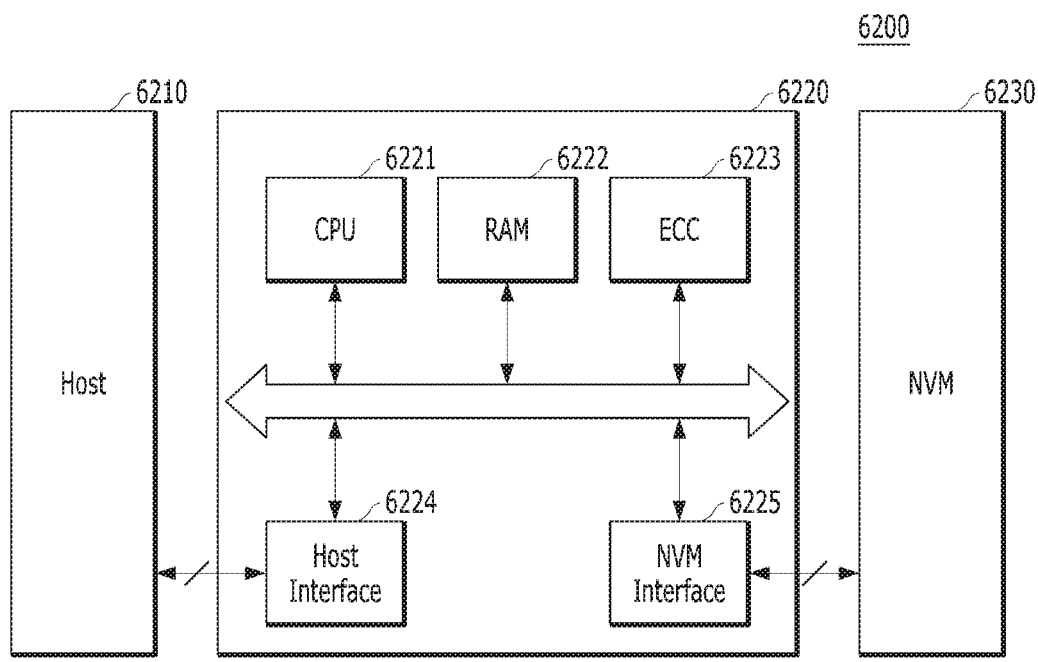

FIG. 12 is a diagram schematically illustrating another example of the data processing system including the memory system in accordance with an embodiment.

Referring to FIG. 12, a data processing system 6200 may include a memory device 6230 having one or more nonvolatile memories and a memory controller 6220 for controlling the memory device 6230. The data processing system 6200 may serve as a storage medium such as a memory card (e.g., CF, SD, micro-SD or the like) or USB device, as described with reference to FIGS. 1 and 2. The memory device 6230 may correspond to the memory device 150 in the memory system 110 illustrated in FIGS. 1 and 5. The memory controller 6220 may correspond to the controller 130 in the memory system 110 illustrated in FIGS. 1 and 5.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221. The RAM 6222 may be used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

The ECC circuit 6223 may correspond to the ECC unit 138 of the controller 130 illustrated in FIG. 1. As described with reference to FIG. 1, the ECC circuit 6223 may generate an error correction code (ECC) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may exchange data with the host 6210 through the host interface 6224. The memory controller 6220 may exchange data with the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or long term evolution (LTE). The memory controller 6220 may be connected to an external device, for example, the host 6210 or another external device, and then exchange data with the external device. Particularly, as the memory controller 6220 is configured to communicate with the external device through one or more of various communication protocols, the memory system and the data processing system may be applied to wired/wireless electronic devices, particularly a mobile electronic device.

Figure 13:
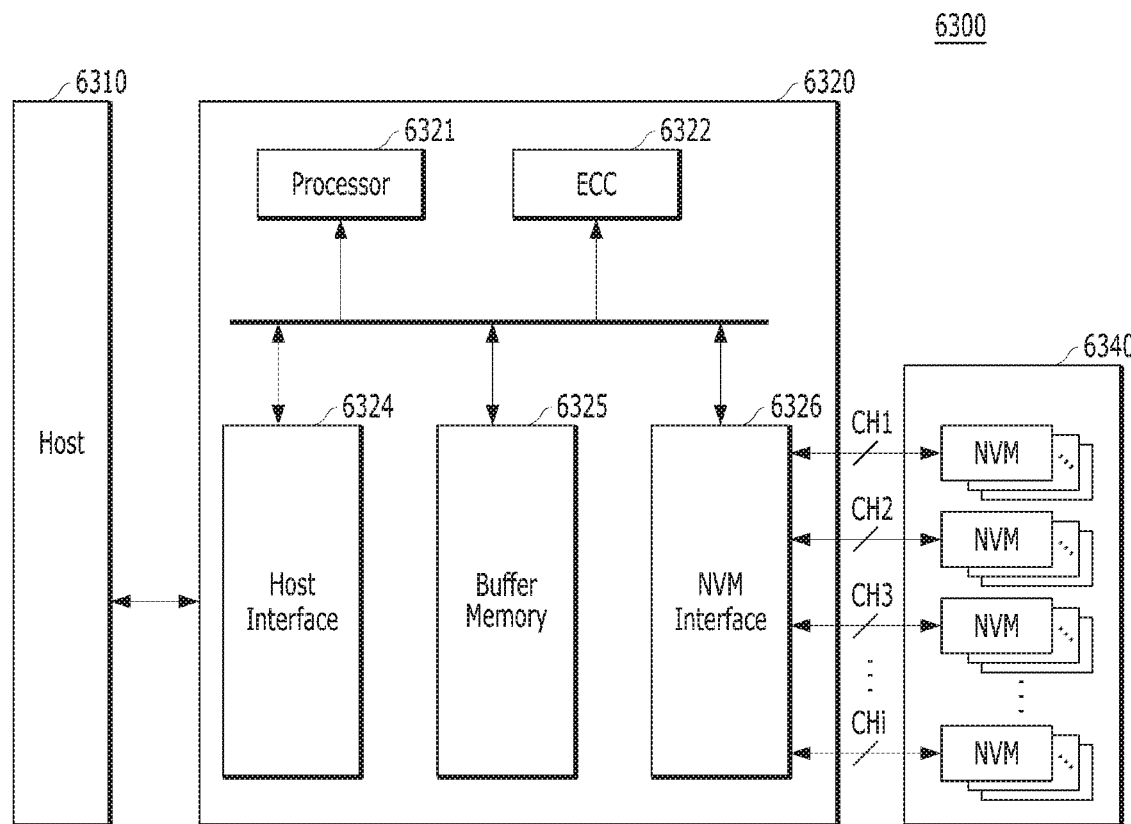

FIG. 13 is a diagram schematically illustrating another example of the data processing system including the memory system in accordance with an embodiment. FIG. 13 schematically illustrates a solid state drive (SSD) 6300 to which the memory system is applied.

Referring to FIG. 13, the SSD 6300 may include a controller 6320 and a memory device 6340 including a plurality of nonvolatile memories (NVM). The controller 6320 may correspond to the controller 130 in the memory system 110 of FIGS. 1 and 2. The memory device 6340 may correspond to the memory device 150 in the memory system of FIGS. 1 and 5.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. As an example, FIG. 13 illustrates that the buffer memory 6325 is disposed in the controller 6320. However, the buffer memory 6325 may be external to the controller 6320.

The ECC circuit 6322 may calculate an ECC value of data to be programmed to the memory device 6340 during a program operation. The ECC circuit 6322 may perform an error correction operation on data read from the memory device 6340 based on the ECC value during a read operation. The ECC circuit 6322 may perform an error correction operation on data recovered from the memory device 6340 during a failed data recovery operation.

The host interface 6324 may provide an interface function with an external device, for example, the host 6310. The nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, redundant array of independent disks (RAID) system. The RAID system may include the plurality of SSDs 6300 and a RAID controller for controlling the plurality of SSDs 6300.

When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300. The RAID controller may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300. The RAID controller may provide data read from the selected SSDs 6300 to the host 6310.

Figure 14:
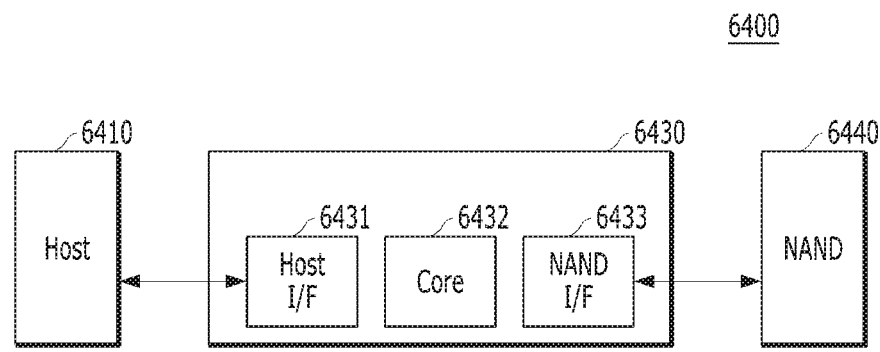

FIG. 14 is a diagram schematically illustrating another example of the data processing system including the memory system in accordance with an embodiment. FIG. 11 schematically illustrates an embedded multi-media card (eMMC) 6400 to which the memory system is applied.

Referring to FIG. 14, the eMMC 6400 may include a controller 6430 and a memory device 6440 embodied by one or more NAND flash memories. The controller 6430 may correspond to the controller 130 in the memory system 110 of FIGS. 1 and 2. The memory device 6440 may correspond to the memory device 150 in the memory system 110 of FIGS. 1 and 5.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400. The host interface 6431 may provide an interface function between the controller 6430 and the host 6410. The NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 15 to 18 are diagrams schematically illustrating other examples of the data processing system including the memory system in accordance with embodiments. FIGS. 15 to 18 schematically illustrate UFS (Universal Flash Storage) systems to which the memory system is applied.

Referring to FIGS. 15 to 18, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIGS. 1 and 5. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 13 to 16, and the UFS cards 6530, 6630, 6730, 6830 may be embodied in the form of the memory card system 6100 described with reference to FIG. 11.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, for example, an UFDs, a MMC, a SD, a mini-SD, and a micro-SD.

Figure 15:
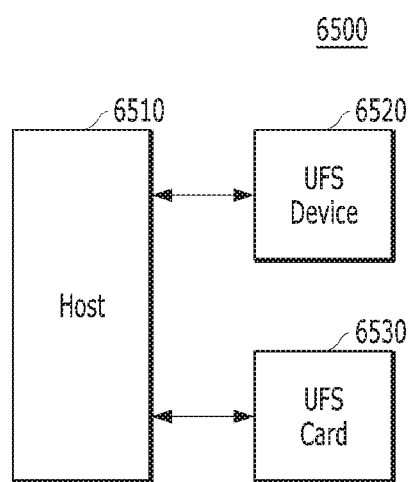

In the UFS system 6500 illustrated in FIG. 15, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the embodiment of FIG. 15, the configuration in which one UFS device 6520 and one UFS card 6530 are connected to the host 6510 is illustrated. However, in another embodiment, a plurality of UFS devices and UFS cards may be connected in parallel or in the form of a star to the host 6410. The form of a star is an arrangement in which a single centralized component is coupled to plural devices for parallel processing. A plurality of UFS cards may be connected in parallel or in the form of a star to the UFS device 6520 or connected in series or in the form of a chain to the UFS device 6520.

Figure 16:
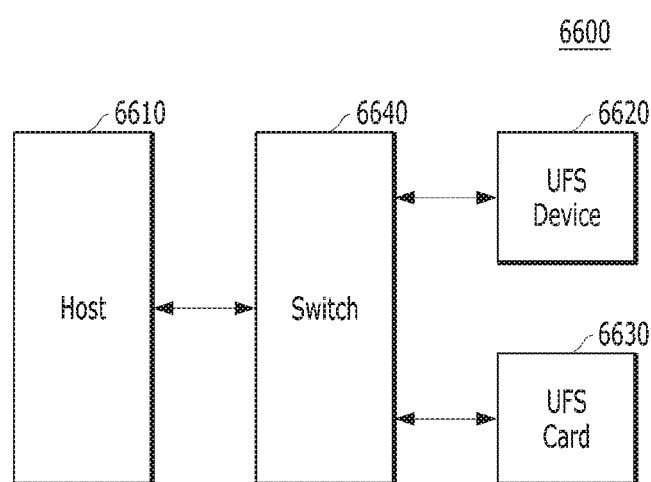

In the UFS system 6600 illustrated in FIG. 16, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the embodiment of FIG. 16, the configuration in which one UFS device 6620 and one UFS card 6630 are connected to the switching module 6640 is illustrated. However, in another embodiment, a plurality of UFS devices and UFS cards may be connected in parallel or in the form of a star to the switching module 6640, and a plurality of UFS cards may be connected in series or in the form of a chain to the UFS device 6620.

Figure 17:
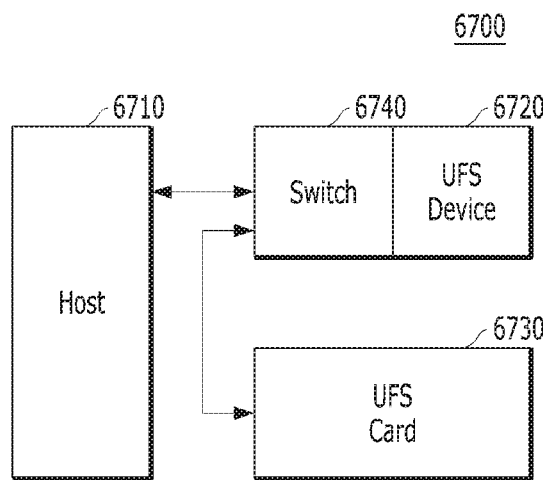

In the UFS system 6700 illustrated in FIG. 17, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the embodiment of FIG. 17, the configuration in which one UFS device 6720 and one UFS card 6730 are connected to the switching module 6740 is illustrated. However, in another embodiment, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 18:
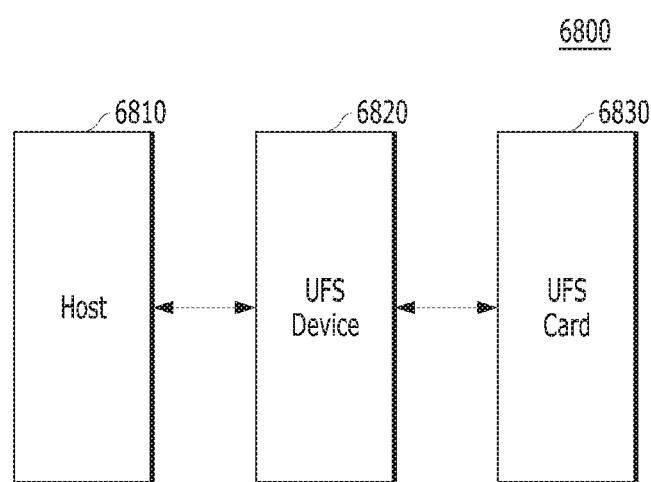

In the UFS system 6800 illustrated in FIG. 18, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. The host 6810 and the UFS card 6830 may communicate with each other through target ID switching between the M-PHY and UniPro modules of the UFS device 6820. In the embodiment of FIG. 18, the configuration in which one UFS device 6820 is connected to the host 6810 and one UFS card 6830 is connected to the UFS device 6820 is illustrated. However, in another embodiment, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 19:
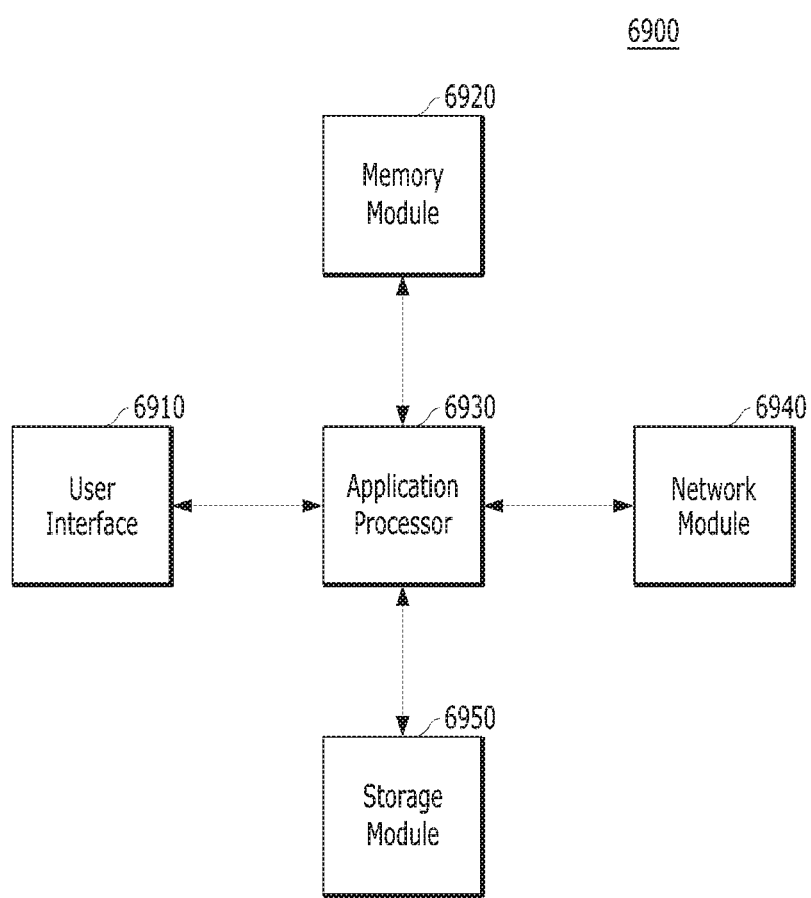

FIG. 19 is a diagram schematically illustrating another example of the data processing system including the memory system in accordance with an embodiment of the present invention. FIG. 19 is a diagram schematically illustrating a user system 6900 to which the memory system is applied.

Referring to FIG. 19, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as system-on-chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on Package on Package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIGS. 1 and 5. Furthermore, the storage module 6950 may be embodied as an SSD, an eMMC and an UFS as described above with reference to FIGS. 11 to 18.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5 is applied to a mobile electronic device of the user system 6900, the application processor 6930 may control overall operations of the mobile electronic device. The network module 6940 may serve as a communication module for controlling wired/wireless communication with an external device. The user interface 6910 may display data processed by the processor 6930 on a display/touch module of the mobile electronic device. Further, the user interface 6910 may support a function of receiving data from the touch panel.

In accordance with at least one of the embodiments described above, when it is determined that a storage space in the memory system is insufficient, a priority may be given to not-good blocks, abnormal block or bad blocks based on status information of each block. By making some of the not-good blocks, the abnormal block or the bad blocks available in an emergency or other situation of urgency, the efficiency of the memory system may be improved.

In addition, when controlling or managing a plurality of memory blocks in a memory device, at least one of the embodiments may list not-good blocks including a bad block, which are not healthy. Thus, a priority of the not-good blocks or bad blocks in the block list may be set so that a controller may determine a usability and an order of use according to the priority. This allows more granular management and control for reusing the not-good block or the bad block.

While the disclosure has been illustrated and described with respect to the specific embodiments, it will be apparent to those skilled in the art in light of the present disclosure that various changes and modifications may be made without departing from the spirit and scope of the invention as defined in the following claims.

What is claimed is:

1. A memory system, comprising:
a non-volatile memory device including at least one memory blocks storing data; and
a controller, coupled to the non-volatile memory device, suitable for:
performing at least one program operation or at least one erase operation within at least one memory block;
recognizing an operation status of the at least one memory block in response to a time consumed for completing the at least one program operation or the at least one erase operation; and
determining whether the at least one memory block is used and which priority between a highest priority and a lowest priority is given to the at least one memory block so that the at least one memory block is allocated for a following operation,
wherein whether the at least one memory block is used and which priority between the highest priority and the lowest priority is given to the at least one memory block are determined based on the operation status and a size of bad word line group of the at least one memory block,
wherein the bad word line group includes at least one bad word line, and
wherein the controller assigns a higher priority between the highest priority and the lowest priority to the at least one memory block as the size of the bad word line group is smaller.

2. The memory system according to claim 1, wherein the controller suspends use of the at least one memory block when the at least one program operation or the at least one erase operation is not completed.

3. The memory system according to claim 1, wherein the time consumed falls within a cycle for the performed operation, when the at least one program operation or the at least one erase operation is performed in a normal memory block.

4. The memory system according to claim 3, wherein the at least one program operation or the at least one erase operation includes a plurality of unit operations, and the time consumed is determined by a check operation performed after each of the unit operations is completed.

5. The memory system according to claim 4, wherein the at least one memory block has the highest priority when the at least one memory block has a smallest size of the bad word line group, and
the at least one memory block having the highest priority is available for the following operation.

6. The memory system according to claim 5, wherein the at least one memory block is not given the priority between the highest priority and the lowest priority when all of word lines the at least one memory block have are bad.

7. The memory system according to claim 5, wherein the controller allocates the at least one memory block in a reverse order of the size of the bad word line group for a following program operation, and
the controller selects the at least one memory block in an order of the size of the bad word line group for a following erase operation.

8. The memory system according to claim 1, wherein the at least one memory block having a higher priority is used first for a following program operation, and the at least one memory block having a lower priority is selected first for a following erase operation.

9. The memory system according to claim 1, wherein the time consumed for completing the at least one program operation or the at least one erase operation is determined based on at least one bad word line.

10. A method for controlling a memory system, comprising:
   requesting at least one program operation or at least one erase operation to a memory device including a plurality of memory blocks including a plurality of pages;
   performing the at least one program operation or the at least one erase operation within at least one memory block;
   recognizing an operation status of the at least one memory block in response to a time consumed for completing the at least one program operation or the at least one erase operation; and
   determining whether the at least one memory block is used and which priority between a highest priority and a lowest priority is given to the at least one memory block so that the at least one memory block is allocated for a following operation,
   wherein whether the at least one memory block is used and which priority between the highest priority and the lowest priority is given to the at least one memory block are determined based on the operation status and size of bad word line group of the at least one memory block,
   wherein the bad word line group includes at least one bad word line, and
   wherein a higher priority between the highest priority and the lowest priority is assigned to the at least one memory block as the size of the bad word line group is smaller.

11. The method according to claim 10, wherein the determining whether the at least one memory block is used includes;
   suspending use of the at least one memory block when the at least one program operation or the at least one erase operation is not completed.

12. The method according to claim 10, wherein the time consumed falls within a cycle for a performed operation, when the performed operation is performed in a normal memory block.

13. The method according to claim 12, wherein the at least one program operation or the at least one erase operation includes a plurality of unit operations, and the time consumed is determined by a check operation performed after each of the unit operations is completed.

14. The method according to claim 13, wherein the at least one memory block has the highest priority when the at least one memory block has a smallest size of the bad word line group, and
   the at least one memory block having the highest priority is available for the following operation.

15. The method according to claim 14, wherein the at least one memory block is not given the priority between the highest priority and the lowest priority when all of word lines the at least one memory block have are bad.

16. The method according to claim 14, wherein the determining whether the at least one memory block is used includes
   allocating the at least one memory block in a reverse order of the size of the bad word line group for a following program operation; and
   selecting the at least one memory block in an order of the size of the bad word line group for a following erase operation.

17. The method according to claim 10, wherein the at least one memory block having a higher priority is used first for a following program operation, and the at least one memory block having a lower priority is selected first for a following erase operation.

18. A control apparatus for a memory system, comprising:
   a memory interface, coupled to a memory device including a plurality of memory blocks including a plurality of pages, for performing an operation within at least one memory block among the plurality of memory blocks;
   control logic for recognizing an operation status of the at least one memory block in response to a time consumed for completing the operation and determining whether the at least one memory block is used and which priority between a highest priority and a lowest priority is given to the at least one memory block; and
   a host interface, coupled to a host, for transferring a command or data received from the host to the control logic or transferring data which is requested by the host and transmitted from the memory interface,
   wherein whether the at least one memory block is used and which priority between the highest priority and the lowest priority is given to the at least one memory block are determined based on the operation status and a size of bad word line group,
   wherein the bad word line group includes at least one bad word line, and
   wherein the control logic assigns a higher priority between the highest priority and the lowest priority to the at least one memory block as the size of the bad word line group is smaller.

* * * * *